(12) United States Patent
Choi et al.

(10) Patent No.: US 10,361,763 B2
(45) Date of Patent: Jul. 23, 2019

(54) CHANNEL STATE INFORMATION FEEDBACK METHOD AND DEVICE IN WIRELESS COMMUNICATION SYSTEM

(71) Applicant: Samsung Electronics Co., Ltd., Suwon-si, Gyeonggi-do (KR)

(72) Inventors: Seunghoon Choi, Seongnam-si (KR); Youngwoo Kwak, Suwon-si (KR); Hoondong Noh, Suwon-si (KR); Donghan Kim, Osan-si (KR); Jinyoung Oh, Seoul (KR); Younsun Kim, Seongnam-si (KR); Sangmin Ro, Seoul (KR); Hyoungju Ji, Seoul (KR); Taehan Bae, Seoul (KR); Cheolkyu Shin, Suwon-si (KR); Youngbum Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/753,792

(22) PCT Filed: Aug. 22, 2016

(86) PCT No.: PCT/KR2016/009261
§ 371 (c)(1),
(2) Date: Feb. 20, 2018

(87) PCT Pub. No.: WO2017/030429
PCT Pub. Date: Feb. 23, 2017

(65) Prior Publication Data
US 2018/0248606 A1  Aug. 30, 2018

Related U.S. Application Data

(60) Provisional application No. 62/207,619, filed on Aug. 20, 2015.

(51) Int. Cl.
*H04B 7/06* (2006.01)
*H04B 7/0456* (2017.01)
*H04L 5/00* (2006.01)

(52) U.S. Cl.
CPC ......... *H04B 7/0626* (2013.01); *H04B 7/0478* (2013.01); *H04B 7/0634* (2013.01); *H04L 5/0048* (2013.01)

(58) Field of Classification Search
CPC .. H04B 7/0478; H04B 7/0634; H04B 7/0626; H04L 5/0048
See application file for complete search history.

(56) References Cited

U.S. PATENT DOCUMENTS

| 2012/0094681 A1 | 4/2012 | Freda et al. |
| 2012/0176939 A1* | 7/2012 | Qu ....................... H04L 5/0023 370/255 |

(Continued)

FOREIGN PATENT DOCUMENTS

| EP | 3 216 238 A1 | 9/2017 |
| KR | 10-2014-0108793 A | 9/2014 |

(Continued)

OTHER PUBLICATIONS

3rd Generation Partnership Project; Technical Specification Group Services and System Aspects; Group based Enhancements; (Release 13), 3GPP TR 23.769 V0.3.1, XP050926792, Mar. 19, 2014.

(Continued)

*Primary Examiner* — Syed Haider
(74) *Attorney, Agent, or Firm* — Jefferson IP Law, LLP

(57) ABSTRACT

The present disclosure relates to a pre-5th-Generation (5G) or 5G communication system to be provided for supporting higher data rates Beyond 4th-Generation (4G) communication system such as Long Term Evolution (LTE). The present disclosure relates to a method and device for reporting channel state information. The method for a terminal according to the present disclosure comprises the steps of: receiving feedback configuration information from a base station; measuring a channel state using a reference signal received from the base station; and reporting channel state information using two subsamplings at a reporting time which is determined on the basis of the feedback configuration information.

11 Claims, 30 Drawing Sheets

(56) References Cited

U.S. PATENT DOCUMENTS

| | | |
|---|---|---|
| 2013/0007287 A1 | 1/2013 | Chu et al. |
| 2013/0322279 A1 | 12/2013 | Chincholi et al. |
| 2013/0336156 A1 | 12/2013 | Wei et al. |
| 2014/0079149 A1* | 3/2014 | Lee .................. H04B 7/0417 375/267 |
| 2014/0112251 A1 | 4/2014 | Kim et al. |
| 2014/0198663 A1 | 7/2014 | Xu et al. |
| 2014/0241274 A1* | 8/2014 | Lee .................. H04L 5/0048 370/329 |
| 2014/0355705 A1 | 12/2014 | Chen et al. |
| 2014/0362940 A1 | 12/2014 | Yue et al. |
| 2015/0029966 A1* | 1/2015 | Park .................. H04L 5/0014 370/329 |
| 2015/0230065 A1 | 8/2015 | Zisimopoulos et al. |
| 2016/0006495 A1* | 1/2016 | Kim .................. H04B 7/0456 370/329 |
| 2016/0007138 A1 | 1/2016 | Palanisamy et al. |
| 2016/0007316 A1 | 1/2016 | Vaidya et al. |
| 2016/0142981 A1 | 5/2016 | Yi et al. |
| 2016/0218791 A1 | 7/2016 | Ko et al. |
| 2017/0251342 A1 | 8/2017 | Bhalla |
| 2017/0339534 A1 | 11/2017 | Bhalla |

FOREIGN PATENT DOCUMENTS

| | | |
|---|---|---|
| WO | 2012/039588 A2 | 3/2012 |
| WO | 2014/196822 A1 | 12/2014 |
| WO | 2015/012654 A1 | 1/2015 |

OTHER PUBLICATIONS

3rd Generation Partnership Project; Technical Specification Group Core Network and Terminals; Group Communication System Enablers for LTE (GCSE_LTE); MB2 Reference Point; Stage 3 (Release 12), 3GPP TS 29.468 V12.0.1, XP050926781, Oct. 29, 2014.
Alcatel-Lucent, Response to R3-150063 on Paging for MTC, 3GPP TSG-RAN WG3 Meeting #87, R3-150352, Feb. 8, 2015.
3rd Generation Partnership Project; Technical Specification Group Services and System Aspects; General Packet Radio Service (GPRS) enhancements for Evolved Universal Terrestrial Radio Access Network (E-UTRAN) access (Release 13), 3GPP TS 23.401 V13.2.0, XP050927727, Mar. 12, 2015.
3rd Generation Partnership Project; Technical Specification Group Radio Access Network; Evolved Universal Terrestrial Radio Access (E-UTRA); Radio Resource Control (RRC); Protocol specification (Release 12), 3GPP TS 36.331 V12.1.0, XP050769960, Mar. 19, 2014.
Samsung, Paging Optimization for Rel-13 Low Complexity MTC, 3GPP TSG RAN WG2 #89bis, R2-151641, Apr. 11, 2015.
3rd Generation Partnership Project; Technical Specification Group Services and System Aspects; General Packet Radio Service (GPRS) enhancements for Evolved Universal Terrestrial Radio Access Network (E-UTRAN) access (Release 13), 3GPP TS 23.401 V13.6.0, XP051086074, Mar. 7, 2016.
NTT Docomo, Views on PHY layer options for LAA DL, 3GPP Draft; R1-145107, San Francisco, USA, Nov. 17, 2014, XP050876139.
Huawei et al., 'Solutions on Message delivery to a group of devices', S2-143232, SA WG2 Meeting #105, Oct. 8, 2014.
Zte et al., 'Selection of method for delivery of Group Message to group of devices', S2-143017, SA WG2 Meeting #105, Oct. 7, 2014.
Cisco Systems Inc., 'Solution for key issue 5.1', S2-142973, SA WG2 Meeting #105, Oct. 8, 2014.
Interdigital, 'Solution for key issue on SCS/AS Notification/Request for Group PSM Usage', S2-143328, SA WG2 Meeting #105, Oct. 8, 2014.
ETSI TS 123 468 V12.2.0 Sep. 2014, LTE; Group Communication System Enablers for LTE (GCSE_LTE); Stage 2 (3GPP TS 23.468 version 12.2.0 Release 12).
3GPP TR 23.769 V1.0.0 Dec. 2014, 3rd Generation Partnership Project; Technical Specification Group Services and System Aspects; Group based Enhancements (Release 13).
U.S. Office Action dated Apr. 28, 2017, issued in U.S. Appl. No. 14/936,098.
U.S. Office Action dated Apr. 6, 2018, issued in U.S. Appl. No. 14/936,098.
3 Generation Partnership Project; Technical Specification Group Radio Access Network; Evolved Universal Terrestrial Radio Access (E-UTRA); Physical layer procedures (Release 12), 3GPP TS 36.213 V12.6.0, Jul. 3, 2015, pp. 6-165, XP050965828.
United States Office Action dated Dec. 3, 2018, issued in U.S. Appl. No. 14/936,098.
Huawei, Hisilicon, Solutions on Message delivery to a group of devices [online], 3GPP TSG-SA WG2 #105 S2-143771 Oct. 13-17, 2014, Sapporo, Japan. pp. 1-4.
Japanese Office Action dated Apr. 15, 2019, issued in Japanese Application No. 2017-524424.

* cited by examiner

CHANNEL STATE INFORMATION FEEDBACK METHOD AND DEVICE IN WIRELESS COMMUNICATION SYSTEM

TECHNICAL FIELD

Various embodiments of the present disclosure relate to a wireless communication system, and more particularly, to a method for measuring channel state information in a wireless communication system and feeding back the same.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mm Wave) bands, e.g., 60 GHz bands, so as to accomplish higher data rates. To decrease propagation loss of the radio waves and increase the transmission distance, the beam-forming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology. Meanwhile, a current mobile communication system has been developed from a mobile communication system providing a voice centered service in the early stage toward high-speed, high-quality wireless packet data communication system for providing a data service and a multimedia service. For this purpose, various standardization organizations such as 3GPP, 3GPP2, and IEEE have progressed a 3 generation advanced mobile communication system standard to which a multiple access scheme using a multi-carrier is applied. Recently, various mobile communication standards such as long term evolution (LTE) of the 3GPP, ultra mobile broadband (UMB) of the 3GPP2, and 802.16m of the IEEE have been developed to support a high-speed, high-quality wireless radio data transmission service based on the multiple access scheme using the multi-carrier.

The existing 3rd advanced mobile communication systems such as LTE, UMB, and 802.16m are based on a multi-carrier and multiple access scheme, apply a multiple input multiple output (MIMO) (hereinafter, which can be interchangeably used with the term "multiple antenna") to improve transmission efficiency, and uses various technologies such as a beam-forming method, an adaptive modulation and coding (AMC) method, a channel sensitive scheduling method. The above-mentioned technologies improves transmission efficiency by a method for intensifying transmit power of a signal transmitted from several antennas or controlling the transmitted amount of data depending on channel quality, or the like and transmitting selectively data to a user having good channel quality, thereby improving system capacity performance. Since the techniques are operated based on the channel state information between an evolved node B (eNB) (base station (BS)) and user equipment (UE) (mobile station (MS)), the eNB or the UE needs to measure the channel state between the base station and the mobile station. For this purpose, a channel status information reference signal (CSI-RS) is used. The base station means a downlink transmitting apparatus and an uplink receiving apparatus that are located at a certain place and one base station may perform transmission and reception to/from a plurality of cells. In a mobile communication system, a plurality of base stations are geographically dispersed, and each base station can perform transmission and reception of a plurality of cells.

Meanwhile, the FD-MIMO system may refer to a wireless communication system in which the existing LTE/LTE-A MIMO technology has evolved and transmits and receives data using 32 or more transmission antennas. At this time, in order to effectively implement the FD-MIMO system, the UE may accurately measure channel conditions and a magnitude of interference, and generate channel state information and report the generated channel state information to the base station. However, in the FD-MIMO where the number of antennas is increased, it is not suitable to apply the specified transmission and reception method in consideration of only up to 8 one-dimensional array transmission antennas, and as a result, a new feedback method applicable to various antenna array shapes is required.

DISCLOSURE OF INVENTION

Technical Problem

An object of the present disclosure is directed to the provision of a method and a device for transmitting PMI by dividing the PMI into a plurality of dimensions using various types of codebook subsampling in order to reduce an overhead at the time of reporting the PMI.

Another object of the present disclosure is directed to the provision of a method for reporting only PMI corresponding to one dimension among channel state information corresponding to a plurality of dimensions in periodic and aperiodic channel state reports.

Solution to Problem

Various embodiments of the present disclosure are directed to the provision of a method for a terminal, including: receiving feedback configuration information from a base station; measuring a channel state using a reference signal received from the base station; and reporting channel state information using two subsamplings at a reporting time which is determined based on the feedback configuration information.

Various embodiments of the present disclosure are directed to the provision of a method for a base station, including: transmitting feedback configuration information to a terminal; transmitting a reference signal to the terminal; and receiving channel state information generated based on the reference signal using two subsamplings at a reporting time determined based on the feedback configuration information.

Various embodiments of the present disclosure are directed to the provision of a terminal, including: a transceiver configured to transmit or receive a signal; and a controller configured to receive feedback configuration information from a base station, measure a channel state using a reference signal received from the base station, and reporting channel state information using two subsamplings at a reporting time determined based on the feedback configuration information.

Various embodiments of the present disclosure are directed to the provision of a base station, including: a transceiver configured to transmit or receive a signal; and a controller configured to transmit feedback configuration information to a terminal, transmit a reference signal to the terminal, and receive channel state information generated based on the reference signal using two subsamplings at a reporting time determined based on the feedback configuration information.

Advantageous Effects of Invention

According to the present disclosure, the terminal may report only the PMI corresponding to one dimension among the channel state information corresponding to the plurality of dimensions in the periodic and aperiodic channel state reports by the method proposed by the present disclosure, thereby reducing the overhead occurring at the time of transmitting the channel state report.

BEST MODE FOR CARRYING OUT THE INVENTION

Figure 1:
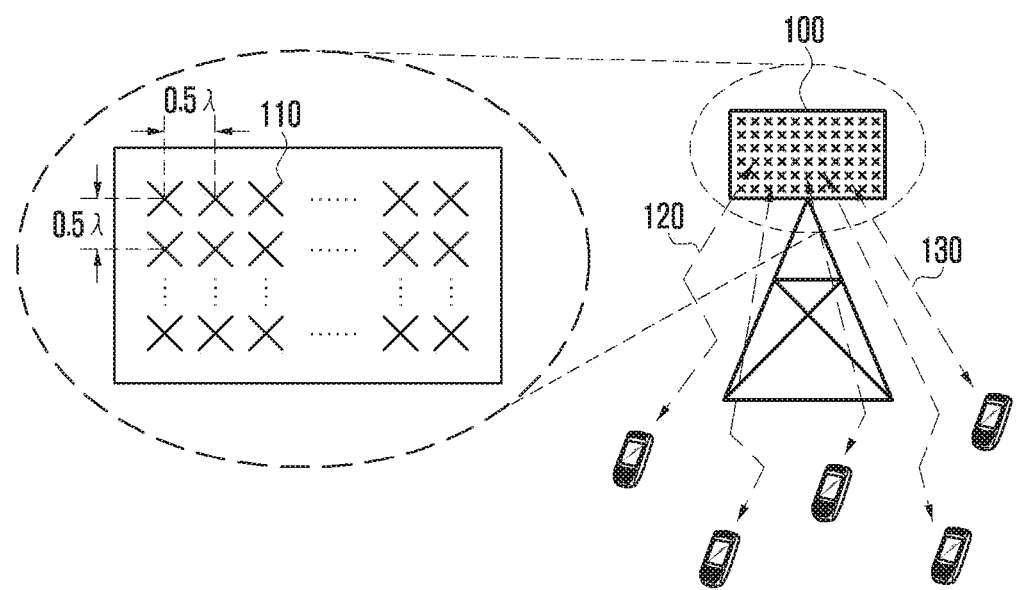
FIG. 1 is a diagram showing an FD-MIMO system.

Hereinafter, embodiments of the present disclosure will be described in detail with reference to the accompanying drawings.

In describing the embodiments of the present disclosure, a description of technical contents which are well known to the art to which the present disclosure belongs and are not directly connected with the present disclosure will be omitted. This is to more clearly transfer a gist of the present disclosure by omitting an unnecessary description.

For the same reason, some components are exaggerated, omitted, or schematically illustrated in the accompanying drawings. Further, the size of each component does not exactly reflect its real size. In each drawing, the same or corresponding components are denoted by the same reference numerals.

In describing the exemplary embodiments of the present disclosure in the present specification, a description of technical contents which are well known to the art to which the present disclosure belongs and are not directly connected with the present disclosure will be omitted. This is to more clearly transfer a gist of the present disclosure by omitting an unnecessary description.

For the same reason, some components are exaggerated, omitted, or schematically illustrated in the accompanying drawings. Further, the size of each component does not exactly reflect its real size. In each drawing, the same or corresponding components are denoted by the same reference numerals.

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art can easily understand the scope of the present disclosure. Therefore, the present disclosure will be defined by the scope of the appended claims. Like reference numerals throughout the description denote like elements.

In this case, it may be understood that each block of processing flow charts and combinations of the flow charts may be performed by computer program instructions. Since these computer program instructions may be mounted in processors for a general computer, a special computer, or other programmable data processing apparatuses, these instructions executed by the processors for the computer or the other programmable data processing apparatuses create means performing functions described in block(s) of the flow charts. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Since the computer program instructions may also be mounted on the computer or the other programmable data processing apparatuses, the instructions performing a series of operation steps on the computer or the other programmable data processing apparatuses to create processes executed by the computer to thereby execute the computer or the other programmable data processing apparatuses may also provide steps for performing the functions described in block(s) of the flow charts.

In addition, each block may indicate some of modules, segments, or codes including one or more executable instructions for executing a specific logical function (s). Further, it is to be noted that functions mentioned in the blocks occur regardless of a sequence in some alternative embodiments. For example, two blocks that are contiguously illustrated may be simultaneously performed in fact or be performed in a reverse sequence depending on corresponding functions sometimes.

Here, the term '-unit' used in the present embodiment means software or hardware components such as FPGA and ASIC and the '~unit' performs any roles. However, the meaning of the '~unit' is not limited to software or hardware. The '~unit' may be configured to be in a storage medium that may be addressed and may also be configured to reproduce one or more processor. Accordingly, for example, the '~unit' includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the '~units' may be combined with a smaller number of components and the '~units' or may be further separated into additional components and '~units'. In addition, the components and the '~units' may also be implemented to reproduce one or more CPUs within a device or a security multimedia card.

FIG. 1 is a diagram showing an FD-MIMO system.

The existing 3 generation and fourth generation mobile communication systems such as LTE/LTE-A use an MIMO technology of performing a transmission using a plurality of transmit/reception antennas to increase data a transmission rate and system capacity.

The MIMO technology may spatially separate and transmit a plurality of information streams by using the plurality of transmit/reception antennas. A method for spatially separating and transmitting a plurality of information streams is called a spatial multiplexing method. The application of the spatial multiplexing to some of the information streams may be changed depending on the number of antennas of a transmitter and a receiver. The number of information streams to which the spatial multiplexing may be applied may be referred to as a rank of the corresponding transmission (hereinafter referred to as rank).

The MIMO technology supported in the standard of the LTE/LTE-A Release 11 supports the spatial multiplexing for the case in which there are eight transmit/reception antennas, respectively. At this time, up to eight ranks may be supported. On the other hand, the existing LTE/LTE-A MIMO technology is evolved, and thus the FD-MIMO system may use 32 or more transmission antennas.

The FD-MIMO system is called a wireless communication system transmitting data using tens of transmission antennas. Referring to FIG. 1, base station transmission equipment (or base station 100) includes tens or more of transmission antennas and may transmit a radio signal. The plurality of transmission antennas 110 may be arranged to maintain a minimum distance from each other. The minimum distance may be, for example, half (115) a wavelength length of the transmitted radio signal. In case where the distance between the transmission antennas is kept at half the wavelength length of the radio signal, signals transmitted from each transmission antenna may be affected by a radio channel having a low correlation. For example, in case where a frequency band of the transmitted radio signal is 2 GHz, the distance between the transmission antennas may be 7.5 cm, and in case where a frequency band is higher than 2 GHz, the distance between the transmission antennas may be shorter.

As shown in FIG. 1, tens or more of transmission antennas 110 arranged in the base station 100 may be used to transmit signals 120 and 130 to one or a plurality of terminals. In this case, the signals transmitted from the plurality of transmission antennas 110 may be transmitted to the plurality of terminals at the same time by being applied with appropriate precoding.

In this case, one terminal may receive one or more information stream. Generally, the number of information streams that may be received by one terminal may be determined depending on the number of reception antennas held by the terminal and channel conditions.

To effectively implement the FD-MIMO system, the terminal needs to accurately measure the channel conditions and the magnitude of interference and transmit the channel state information generated using the measured channel conditions and magnitude of interference to the base station The base station receiving the channel state information determines on to which terminals the transmission is performed, on at what data transmission rate the transmission is performed, on what precoding is applied, or the like, by using the channel state information.

However, in the case of the FD-MIMO system, since the number of transmission antennas are many, when the method for transmitting and receiving channel state information of the existing LTE/LTE-A system is applied, a lot of control information needs to be transmitted to the uplink, such that an uplink overhead problem may occur. In the mobile communication system, time, frequency, and power resources are limited. Therefore, if more resources are allocated to the reference signal, the number of resources that may be allocated for a data traffic channel transmission is reduced and an absolute amount of transmitted data may be reduced accordingly. In this case, the performance of channel measurement and estimation is improved but the absolute amount of transmitted data is reduced and therefore the whole system capacity performance may be reduced rather. Therefore, to lead to the optimal performance in terms of the whole system capacity, there is a need to properly distribute the resource for the reference signal and the resource for the data transmission through the traffic channel.

Figure 2:
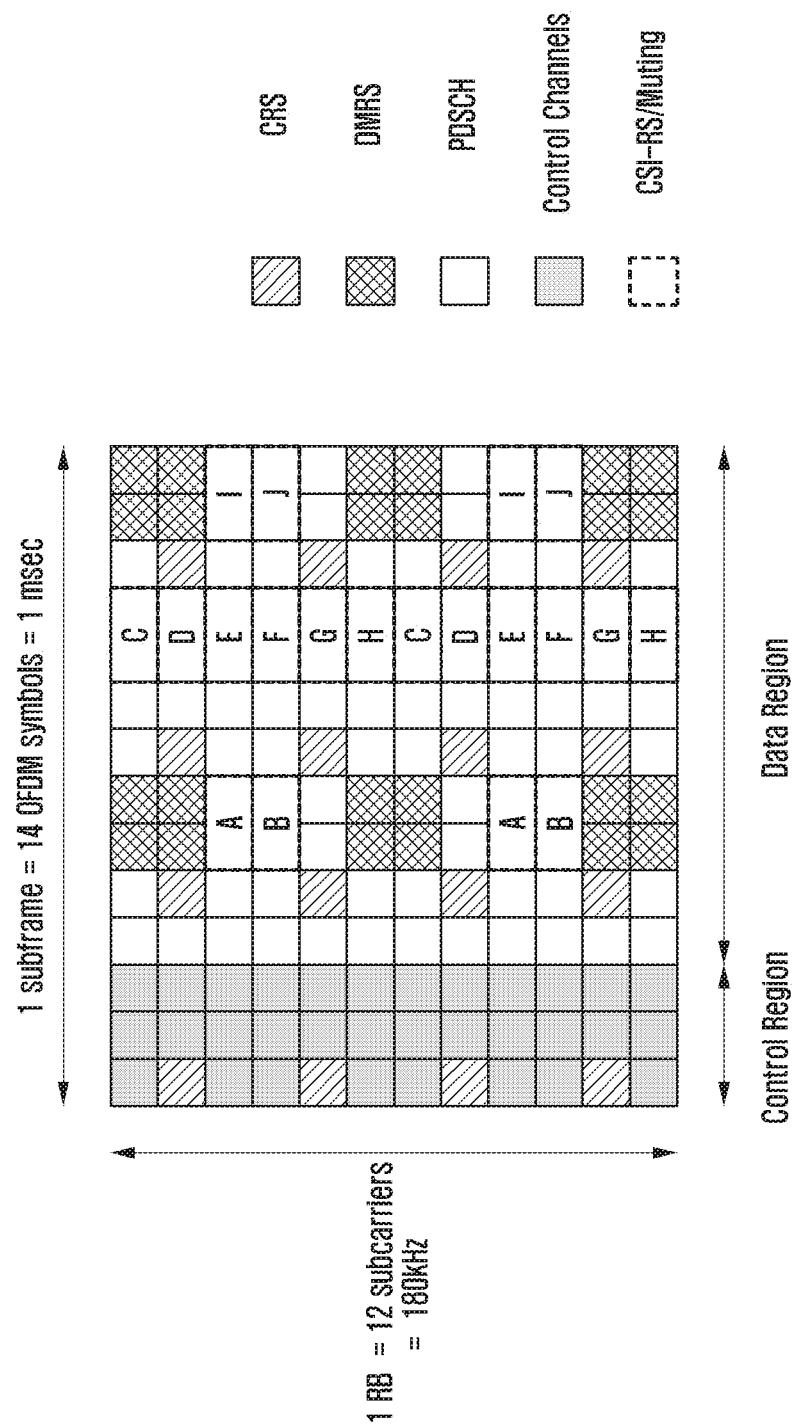
FIG. 2 is a diagram showing a configuration of a subframe.

FIG. 2 is a diagram showing a configuration of a subframe.

The radio resource shown in FIG. 2 may consist of one subframe on a time axis and one resource block (RB) on a frequency axis. The radio resource may consist of 12 sub-carriers in a frequency domain and 14 orthogonal frequency division multiple access (OFDM) symbols in a time domain, so the radio resource may consist of a total of 168 resource elements having a natural frequency and a time location. In the LTE/LTE-A, the resource element having the natural frequency and the time location shown in FIG. 2 may be called a resource element (RE).

A plurality of different kinds of signals may be transmitted to the radio resource shown in FIG. 2 as follows.

1. Cell specific reference signal (CRS): It is a reference signal periodically transmitted for all terminals belonging to one cell and may be commonly used by a plurality of terminals.

2. DMRS: It is a reference signal transmitted for a specific terminal and may be transmitted only when data is transmitted to the corresponding terminal. The DMRS may consist of a total of 8 DMRS ports. In the LTE/LTE-A, ports correspond to the DMRS ports from port 7 to port 14 may maintain orthogonality so that they do not interfere with each other using code divisional modulation (CDM) or frequency division multiplexing (FDM).

3. Physical downlink shared channel (PDSCH): It may refer to a downlink channel used for allowing the base station to transmit traffic (or data) to the terminal. The base station may transmit data using the RE in which the reference signal is not transmitted in a data region (or PDSCH region) of FIG. 2.

4. CSI-RS: It is a reference signal transmitted for terminals belonging to one cell and may be used to measure the channel state. In addition, a plurality of CSI-RSs may be transmitted to one cell.

5. Other control channels (physical hybrid-ARQ indicator channel (PHICH), physical control format indicator channel (PCFICH), physical downlink control channel (PDCCH)): The base station may provide the control information required to allow the terminal to receive data through the PDCCH or transmit ACK/NACK for operating HARQ for the data transmission.

In addition to the signal, in the LTE-A system, the base station may set muting so that the CSI-RS transmitted from other base stations may be received by the terminals of the corresponding cell without interference. The muting may be applied at a location where the CSI-RS may be transmitted. Generally, the terminal may skips the corresponding radio resource to receive the traffic signal. In the LTE-A system, the muting is called zero-power CSI-RS as another term. The reason is that in characteristics of the muting, the muting is applied to the location of the CSI-RS and the transmit power is not transmitted. Hereinafter, the non-muted CSI-RS configuration information may be referred to as NZP CSI-RS configuration information, and the mutated CSI-RS configuration information may be referred to as ZP CSI-RS configuration information.

In FIG. 2, the CSI-RS may be transmitted using some of locations represented by A, B, C, D, E, E, F, G, H, I, and J depending on the number of antennas transmitting the CSI-RS. Further, the muting may also be applied to some of the locations represented by A, B, C, D, E, E, F, G, H, I, and J.

In particular, the CSI-RS may be transmitted as 2, 4, and 8 REs depending on the number of transmitted antenna ports. When the number of antenna ports is 2, the CSI-RS may be transmitted to a half of a specific pattern in FIG. 2, when the number of antenna ports may be 4, the CSI-RS is transmitted to all the specific patterns, and when the number of antenna ports is 8, the CSI-RS may be transmitted using two patterns.

On the other hand, the muting is configured in one pattern unit all the time. That is, the muting may be applied to the plurality of patterns, but when the locations of the CSI-RS do not overlap each other, may not be applied only to a part of one pattern. However, the muting may be applied only to a part of one pattern as long as the location of the CSI-RS and the location of the muting overlap each other.

When the CSI-RSs for two antenna ports are transmitted, the base station may transmit signals of each antenna port in two REs connected to each other on the time base, and the signals of each antenna port may be divided by an orthogonal code. Further, when the CSI-RSs for four antenna ports are transmitted, the signals for the two additional antenna ports may be transmitted to the CSI-RSs for two antenna ports by additionally using two REs. The same method may be used for the case in which the CSI-RSs for eight antenna ports are transmitted.

Meanwhile, as described above, in order to measure the downlink channel state in the cellular system, the base station needs to transmit the reference signal. In the case of the long term evolution advanced (LTE-A) system of the 3GPP, the terminal may measure the channel state between the base station and the terminal by using the CRS or the CSI-RS transmitted from the base station. The channel state needs to basically consider several factors, which may include an interference amount in the downlink. The interference amount in the downlink may include interference signals, thermal noise and the like generated from antennas belonging to neighboring base stations, and the interference amount in the downlink is important information for the terminal to determine the channel condition of the downlink.

As an example, when a signal is transmitted from the base station having one transmission antenna to the terminal having one reception antenna, the terminal needs to determine Es/Io by determining the interference amounts simultaneously received in a section in which energy per symbol which can be received by the downlink in the reference signal received by the base station and the corresponding symbol are received. The determined Es/Io is converted into the data transmission rate or the corresponding value and is transmitted to the base station in a form of a channel quality indicator (CQI), and may determine at what data transmission rate the transmission from the base station to the terminal is performed.

The terminal feedbacks the information on the downlink channel state to the base station so that the terminal may use the fed back information for downlink scheduling of the base station. That is, the terminal may measure the reference signal transmitted from the base station to the downlink, and feeds back the generated information based on the reference signal to the base station. As described above, the information that the terminal feeds back may be referred to as the channel state information, in which the channel state information may include the following three pieces of information.

Rank indicator (RI): Information indicating the number of spatial layers that the terminal may receive in the current channel state Precoder matrix indicator (PMI): Indicator for a precoding matrix that the terminal prefers in the current channel state Channel quality indicator (CQI): Maximum data rate that the terminal may receive in the current channel state The CQI may be replaced by a signal to interference plus noise ratio (SINR) that may be similarly used to the maximum data rate, a maximum error correction code rate and modulation scheme, data efficiency per frequency, and the like.

The RI, PMI, and CQI have a meaning by being associated with one another. As one example, the precoding matrix supported in the LTE/LTE-A is differently defined by each rank. For this reason, the PMI value X when the RI has a value of 1 and the PMI value X when the RI is a value of 2 are interpreted differently. Further, it is assumed that the PMI and the X informed from the terminal to the base station are applied to the base station even when the terminal determines the CQI. That is, informing the base station of RI_X, PMI_Y, and CQI_Z by the terminal is the same as informing that the terminal may receive a data rate corresponding to CQI_Z when a rank is set to be the RI_X and when the PMI is set to be the PMI_Y. As such, by assuming what transmission scheme is performed on the base station when the terminal calculates the CQI, the terminal may obtain the optimized performance when performing the actual transmission using the corresponding transmission scheme.

The periodic feedback of the terminal may be set to be one of the following four feedback modes (feedback mode or reporting mode) depending on what information it includes:

Reporting mode 1-0: RI, wideband CQI (hereinafter, referred to as wCQI)

Reporting mode 1-1: RI, wCQI, PMI

Reporting mode 2-0: RI, wCQI, subband CQI (hereinafter, referred to as sCQI)

Reporting mode 2-1: RI, wCQI, sCQI, PMI

The feedback timing of each information on the four feedback modes may be determined based on values such as transmission period information $N_{pd}$ transmitted to a higher layer signal (e.g., radio resource control (RRC) signal), CQI related offset information $N_{OFFSET,\ CQI}$, RI-related period information $M_{RI}$, and RI-related offset information $N_{OFFSET,RI}$.

In the feedback mode 1-0, a transmission period of the wCQI is $N_{pd}$, and a subframe offset may be defined as the $N_{OFFSET,\ CQI}$. Therefore, in the feedback mode 1-0, the feedback timing may be determined using the transmission period and the subframe offset value. In addition, the transmission period of the RI is $N_{pd}EM_{RI}$, and the offset may be defined as $N_{OFFSET,CQI}+N_{OFFSET,RI}$.

Figure 3:
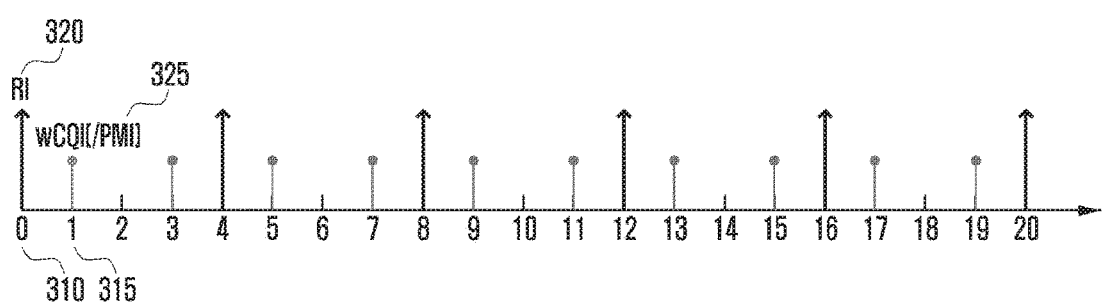
FIG. 3 is a diagram showing feedback timing of channel state information.

FIG. 3 is a diagram showing feedback timing of channel state information.

In the present disclosure, each timing may indicate a subframe index. FIG. 3 is a diagram showing the feedback timings of the RI and the wCQI in the case of $N_{pd}=2$, $M_{RI}=2$, $N_{OFFSET,CQI}=1$, and $N_{OFFSET,RI}=-1$.

As described above, a transmission period of wCQI 325 in the feedback mode 1-0 may be defined as 2, and an offset value thereof may be defined as 1. Accordingly, in the feedback mode 1-0, the terminal may transmit the wCQI 325 starting from subframe 1 315 at 2 subframe periods.

Also, in the feedback mode 1-0, a transmission period of the RI may be defined as 4, and an offset value thereof may be defined as 0. Accordingly, in the feedback mode 1-0, the terminal may transmit the RI 320 starting from subframe 0 310 at 4 subframe periods.

The feedback mode 1-1 has the same feedback timing as the mode 1-0, but is different from the mode 1-0 in that the wCQI and the PMI are transmitted together at wCQI transmission timing.

Meanwhile, in the feedback mode 2-0, a feedback period of the sCQI may be defined as $N_{pd}$ and an offset value thereof may be defined as $N_{OFFSET,CQI}$. Further, an feedback period of the wCQI may be defined as an $HEN_{pd}$ and an offset value thereof may be defined as $N_{OFFSET,CQI}$ like the offset value of the sCQI. Here, H=JEK+1, in which K may be transferred as the higher signal and J may be a value determined depending on a system bandwidth.

For example, a J value for a 10 MHz system may be defined as 3. Consequently, the wCQI may be transmitted by being replaced once whenever the sCQI is transmitted H times. In addition, the period of the RI may be defined as $M_{RI}EHEN_{pd}$, and the offset thereof may be defined as $N_{OFFSET,CQI}+N_{OFFSET,RI}$.

Figure 4:
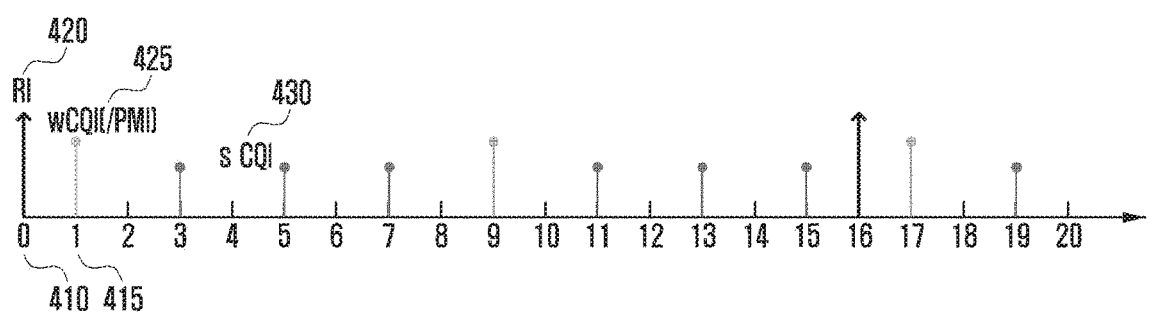
FIG. 4 is another diagram showing the feedback timing of the channel state information.

FIG. 4 is another diagram showing the feedback timing of the channel state information.

FIG. 4 is a diagram showing the feedback timings of the RI, the sCQI, and the wCQI in the case of $N_{pd}=2$, $M_{RI}=2$, J=3 (10 MHz), K=1, $N_{OFFSET,CQI}=1$, and $N_{OFFSET,RI}=-1$.

As described above, in a feedback mode 2-0, a transmission period of sCQI 430 may be defined as 2, and an offset value thereof may be defined as 1. Accordingly, in the feedback mode 2-0, the terminal may transmit the sCQI 430 starting from subframe 1 415 at 2 subframe periods. In FIG. 4, the sCQI is not shown in a subframe in which the wCQI and the sCQI are simultaneously transmitted, but the sCQI may be transmitted in a subframe in which the wCQI is transmitted.

On the other hand, in the feedback mode 2-0, the feedback period of the wCQI may be defined as 2*H, in which H may be defined as 4 by referring to the above equation. Accordingly, the feedback period of the wCQI may be defined as 8, and the offset value thereof may be defined as 1. Accordingly, in the feedback mode 2-0, the terminal may transmit the wCQI 425 starting from the subframe 1 415 at 8 subframe periods.

Also, in the feedback mode 2-0, a transmission period of the RI may be defined as 16, and an offset value thereof may be defined as 0. Accordingly, in the feedback mode 2-0, the terminal may transmit the RI 420 starting from the subframe 0 410 at 16 subframe periods.

In addition, a feedback mode 2-1 has the same feedback timing as the mode 2-0, but is different from the mode 2-0 in that the wCQI and the PMI are transmitted together at the transmission timing of the wCQI.

The above-described feedback timing corresponds to the case in which the number of CSI-RS antenna ports is equal to or less than 4, and in the case of the terminal to which the CSI-RSs for eight antenna ports are allocated, two PMI assumptions need to be fed back differently from the feedback timing.

For eight CSI-RS antenna ports, feedback mode 1-1 may again be divided into two submodes, in which in a first submode (hereinafter, referred to as submode 1 or first submode), the RI may be transmitted along with first PMI information (hereinafter, referred to as PMI1 or first PMI assumption) and second PMI assumption (hereinafter referred to as PMI2 or second PMI assumption) may be transmitted along with the wCQI.

Here, the feedback periods and the offsets of the wCQI and the second PMI may be defined as $N_{pd}$ and $N_{OFFSET,CQI}$, and the feedback periods and the offset values of the RI and the first PMI assumption may each be defined as $N_{pd}EM_{RI}$ and $N_{OFFSET,CQI} + N_{OFFSET,RI}$. Herein, if the precoding matrix corresponding to the first PMI is W1 and the precoding matrix corresponding to the second PMI is W2, the terminal and the base station may share the information that the precoding matrix that the terminal prefers is determined to be W1W2.

In the case of the feedback mode 2-1 for the 8 CSI-RS antenna ports, the feedback of the precoding type indicator (PTI) information may be added. The PTI and the RI may be fed back together, the periods thereof may be defined as $M_{RI}EHEN_{pd}$, and the offsets thereof may be defined as $N_{OFFSET,CQI} + N_{OFFSET,RI}$.

If the PTI is 0, all the first PMI, the second PMI, and the wCQI may be fed back, and the wCQI and the second PMI may be transmitted together at the same timing. At this time, the period in which the wCQI and the second PMI may be transmitted may be defined to be $N_{pd}$, and the offsets thereof may be defined as $N_{OFFSET,\ CQI}$. In addition, the period of the first PMI may be defined as $H'EN_{pd}$, and the offset thereof may be defined as $N_{OFFSET,CQI}$. Here, H' may be transmitted to the terminal as a higher signal.

On the other hand, in the case in which the PTI is 1, the PTI may be transmitted along with the RI, the wCQI and the second PMI may be transmitted together, and the sCQI may be additionally fed back at a separate timing. In this case, the first PMI is not transmitted. The periods and the offsets of PTI and RI may be the same as the case in which the PTI is 0, and the period of the sCQI may be defined as $N_{pd}$ and the offset thereof may be defined as $N_{OFFSET,CQI}$. In addition, the wCQI and the second PMI are fed back having the period of the $HEN_{pd}$ and the offset of the $N_{OFFSET,CQI}$, and the H may be defined like the case in which the number of CSI-RS antenna ports is 4.

Figure 5:
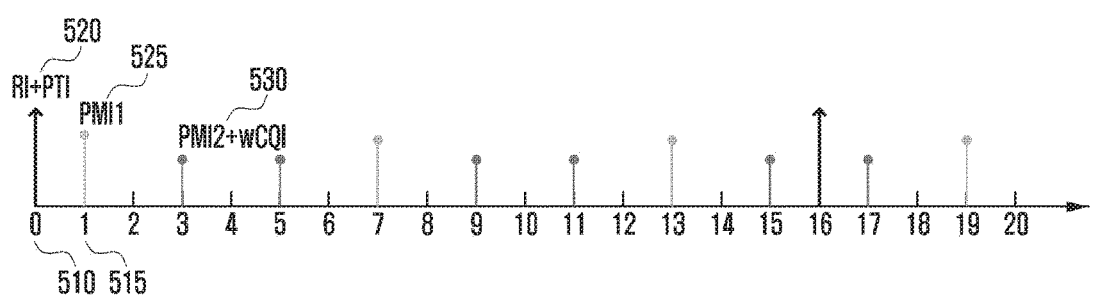
FIG. 5 is a diagram showing the feedback timing of the channel state information according to a PTI value.

FIG. 5 is a diagram showing the feedback timing of the channel state information according to a PTI value.

FIG. 5 shows the feedback timing when the PTI value is 0 in the case of $N_{pd}=2$, $M_{RI}=2$, $J=3$(10 MHz), $K=1$, $H'=3$, $N_{OFFSET,CQI}=-1$, and $N_{OFFSET,RI}=-1$.

As described above, the PTI and the RI may be fed back together, and according to the method described above, the periods thereof can be determined to be 16 and the offsets thereof may be defined as 0.

Accordingly, the terminal may transmit the RI and the PTI starting from subframe 0 510 at 16 subframe periods.

In addition, if the PTI is 0, all the first PMI, the second PMI, and the wCQI may be fed back, the wCQI and the second PMI may be transmitted at the same timing, and the periods thereof may be defined as 2 and the offsets thereof may be defined as 1.

Accordingly, the terminal may transmit the wCQI and the second PMI assumption starting from the subframe 1 515 at 2 subframe periods.

In addition, the period of the first PMI may be defined as 6, and the offset thereof may be defined as 1. Accordingly, the terminal may transmit the first PMI assumption starting from the subframe 1 515 at 6 subframe periods.

As described above, in FIG. 5, the sCQI is not shown in a subframe in which the wCQI and the sCQI are simultaneously transmitted, but the sCQI may be transmitted even in a subframe in which the wCQI is transmitted.

Figure 6:
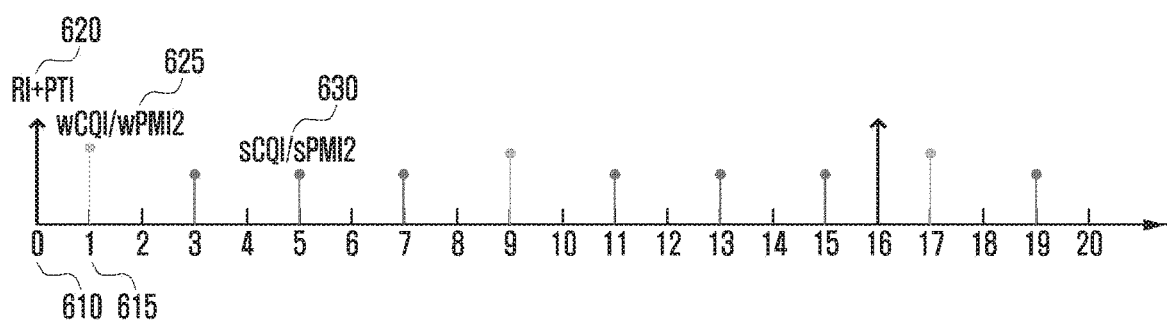
FIG. 6 is another diagram showing the feedback timing of the channel state information according to the PTI value.

FIG. 6 is another diagram showing the feedback timing of the channel state information according to the PTI value.

FIG. 6 shows the feedback timing when the PTI value is 1 in the case of $N_{pd}=2$, $M_{RI}=2$, $J=3$(10 MHz), $K=1$, $H'=3$, $N_{OFFSET,CQI}=-1$, and $N_{OFFSET,RI}=-1$.

As described above, the PTI and the RI may be fed back together, and according to the method described above, the periods thereof can be determined to be 16 and the offsets thereof may be defined as 0.

Accordingly, the terminal may transmit the RI and the PTI starting from subframe 610 at 16 subframe periods.

The second PMI may be divided into a second PMI (wPMI2) in a wideband and a second PMI (sPMI2) in a subband, in which the wPMI2 and the sPMI2 may each be divided into CQI (wCQI) in a wideband and CQI (sCQI) in a subband.

That is, when the PTI is 1, the wCQI and the wPMI2 may be transmitted together, and the sCQI may be fed back with the sPMI2 at a separate timing. In this case, the first PMI may not be transmitted.

The period of the sCQI may be defined as 2 and the offset there may be defined as 1. Accordingly, the terminal may transmit the sCQI starting from subframe 615 at 2 subframe periods.

In addition, the feedback periods of the wCQI and the second PMI may be defined as 8, and the offsets thereof may be defined as 1. Accordingly, the terminal may transmit the wCQI and the second PMI starting from the subframe 1 615 at 8 subframe periods.

As described above, in FIG. 5, the sCQI is not shown in a subframe in which the wCQI and the sCQI are simultaneously transmitted, but the sCQI may be transmitted even in a subframe in which the wCQI is transmitted.

The LTE/LTE-A supports both of the periodic feedback and the aperiodic feedback of the terminal. When the base station intends to acquire the aperiodic feedback information of a specific terminal, the base station may be set to perform the aperiodic feedback using an aperiodic feedback indicator (or channel state information request field, channel state information request information) included in downlink control information (DCI) for the uplink data scheduling of the corresponding terminal, thereby performing the uplink data scheduling of the corresponding terminal. Accordingly, if the terminal receives the indicator set to perform the aperiodic feedback at an n-th subframe, the terminal may perform the uplink transmission by including the aperiodic feedback information in the data transmission at an n+k-th subframe. Here, k is a parameter defined in the 3GPP LTE Release 11 standard and may be defined as 4 in frequency division duplexing (FDD) and may be defined in time division duplexing (TDD) as the following Table 1.

TABLE 1 k values for each subframe number n in TDD UL/DL configuration

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | – | – | 6 | 7 | 4 | – | – | 6 | 7 | 4 |
| 1 | – | – | 6 | 4 | – | – | – | 6 | 4 | – |
| 2 | – | – | 4 | – | – | – | – | 4 | – | – |
| 3 | – | – | 4 | 4 | 4 | – | – | – | – | – |
| 4 | – | – | 4 | 4 | – | – | – | – | – | – |
| 5 | – | – | 4 | – | – | – | – | – | – | – |
| 6 | – | – | 7 | 7 | 5 | – | – | 7 | 7 | – |

When the aperiodic feedback is set, the feedback information may include the RI, the PMI, and the CQI like the case of the periodic feedback, and the RI and the PMI may not be fed back according to the feedback setting. Further, the CQI may also include both of the wCQI and the sCQI and may include only the wCQI information.

Meanwhile, the LTE/LTE-A provides a codebook subsampling function for periodic channel state reporting. In the LTE/LTE-A, the periodic feedback information of the terminal may be transmitted to the base station through a physical uplink control channel (PUCCH). At this time, since the information amount that may be transmitted at a time through the PUCCH is limited, various feedback objects such as the RI, the wCQI, the sCQI, the PMI1, the wPMI2, and the sPMI2 may be transmitted to the PUCCH through subsampling (or subsampling extraction) or more than two pieces of feedback information may be transmitted to the PUCCH while being encoded together (hereinafter, joint encoding).

For example, when the number of CSI-RS ports (hereinafter, CSI-RS ports) set in the base station is 8, the RI and the PMI1 reported in the submode 1 of a PUCCH mode 1-1 may be joint-encoded as shown in Table 2.

TABLE 2

Joint encoding of RI and i1 for PUCCH mode 1-1 submode 1

| Value of joint encoding of RI and the first PMI $I_{RI/PMI1}$ | RI | Codebook index $i_1$ |
|---|---|---|
| 0-7 | 1 | $2I_{RI/PMI1}$ |
| 8-15 | 2 | $2(I_{RI/PMI1}-8)$ |
| 16-17 | 3 | $2(I_{RI/PMI1}-16)$ |
| 18-19 | 4 | $2(I_{RI/PMI1}-18)$ |
| 20-21 | 5 | $2(I_{RI/PMI1}-20)$ |
| 22-23 | 6 | $2(I_{RI/PMI1}-22)$ |
| 24-25 | 7 | $2(I_{RI/PMI1}-24)$ |
| 26 | 8 | 0 |
| 27-31 | reserved | NA |

The RI consisting of 3 bits and the PMI1 consisting of 4 bits based on the above Table 2 is joint-encoded by a total of 5 bits.

Meanwhile, as shown in Table 3, submode 2 of the PUCCH mode 1-1 may jointly encode the PMI1 consisting of 4 bits and the PMI2 consisting of another 4 bits by a total of 4 bits.

Since the subsampling level is larger than that of the submode 1 (4→3 in the case of the submode 1 and 8→4 in the case of the submode 2), more precoding indexes may not be reported.

TABLE 3

Joint encoding of RI, i1 and i2 for PUCCH mode 1-1 submode 2

| RI | Relationship between the first PMI value and codebook index $i_1$ | | Relationship between the second PMI value and codebook index $i_2$ | | total #bits |
|---|---|---|---|---|---|
| | Value of the first PMI $I_{PMI1}$ | Codebook index $i_1$ | Value of the second PMI $I_{PMI2}$ | Codebook index $i_2$ | |
| 1 | 0-7 | $2I_{PMI1}$ | 0-1 | $2I_{PMI2}$ | 4 |
| 2 | 0-7 | $2I_{PMI1}$ | 0-1 | $I_{PMI2}$ | 4 |
| 3 | 0-1 | $2I_{PMI1}$ | 0-7 | $4\lfloor I_{PMI2}/4 \rfloor + I_{PMI2}$ | 4 |
| 4 | 0-1 | $2I_{PMI1}$ | 0-7 | $I_{PMI2}$ | 4 |
| 5 | 0-3 | $I_{PMI1}$ | 0 | 0 | 2 |
| 6 | 0-3 | $I_{PMI1}$ | 0 | 0 | 2 |
| 7 | 0-3 | $I_{PMI1}$ | 0 | 0 | 2 |
| 8 | 0 | 0 | 0 | 0 | 0 |

As another example, when the number of CSI-RS port set in the base station is 8, the PMI2 reported in the PUCCH mode 2-1 may be subsampling as the following Table 4.

TABLE 4

PUCCH mode 2-1 codebook subsampling

| RI | Relationship between the second PMI value and codebook index $i_2$ | |
|---|---|---|
| | Value of the second PMI $I_{PMI2}$ | Codebook index $i_2$ |
| 1 | 0-15 | $I_{PMI2}$ |
| 2 | 0-3 | $2I_{PMI2}$ |
| 3 | 0-3 | $8 \cdot \lfloor I_{PMI2}/2 \rfloor + (I_{PMI2} \bmod 2) + 2$ |
| 4 | 0-3 | $2I_{PMI2}$ |
| 5 | 0 | 0 |
| 6 | 0 | 0 |
| 7 | 0 | 0 |
| 8 | 0 | 0 |

Referring to the above Table 4, the PMI2 may be reported as 4 bits when the RI associated therewith is 1. However, in the case in which the number of associated RIs is 2 or more, a differential CQI for the second codeword is additionally reported together, and therefore it may be appreciated that the PMI2 is reported by being subsampled by 2 bits. In the LTE/LTE-A, the subsampling or the joint encoding can be applied to a total of 6 periodic feedbacks, including the above Tables 2, 3, and 4. To effectively implement the FD-MIMO system as described above, the terminal needs to accurately measure the channel state and the magnitude of the interference and needs to effectively generate the channel state information using the accurately measured channel state and magnitude of interference and report the generated channel state information to the base station. The base station receiving the channel state information may use the reported channel state information to determine on to which terminals the transmission is performed, on at what data transmission rate the transmission is performed, on what precoding is applied, and the like in connection with the downlink transmission. In the case of the FD-MIMO system, since the number of transmission antennas is many and the two-dimensional antenna array is considered, the shape of the antenna array that may be actually applied is also very diverse. Therefore, it is not suitable that the method for transmitting and receiving channel state information designed in consideration of only up to eight one-dimensional array transmission antennas is applied to the FD-MIMO system as it is.

Accordingly, to optimize the FD-MIMO system, there is a need to define a new codebook that is applicable to various antenna array shapes, and if a feedback payload size for the new codebook is changed, there is a need to introduce a new codebook selection restriction function in consideration of the changed size.

Figure 7:
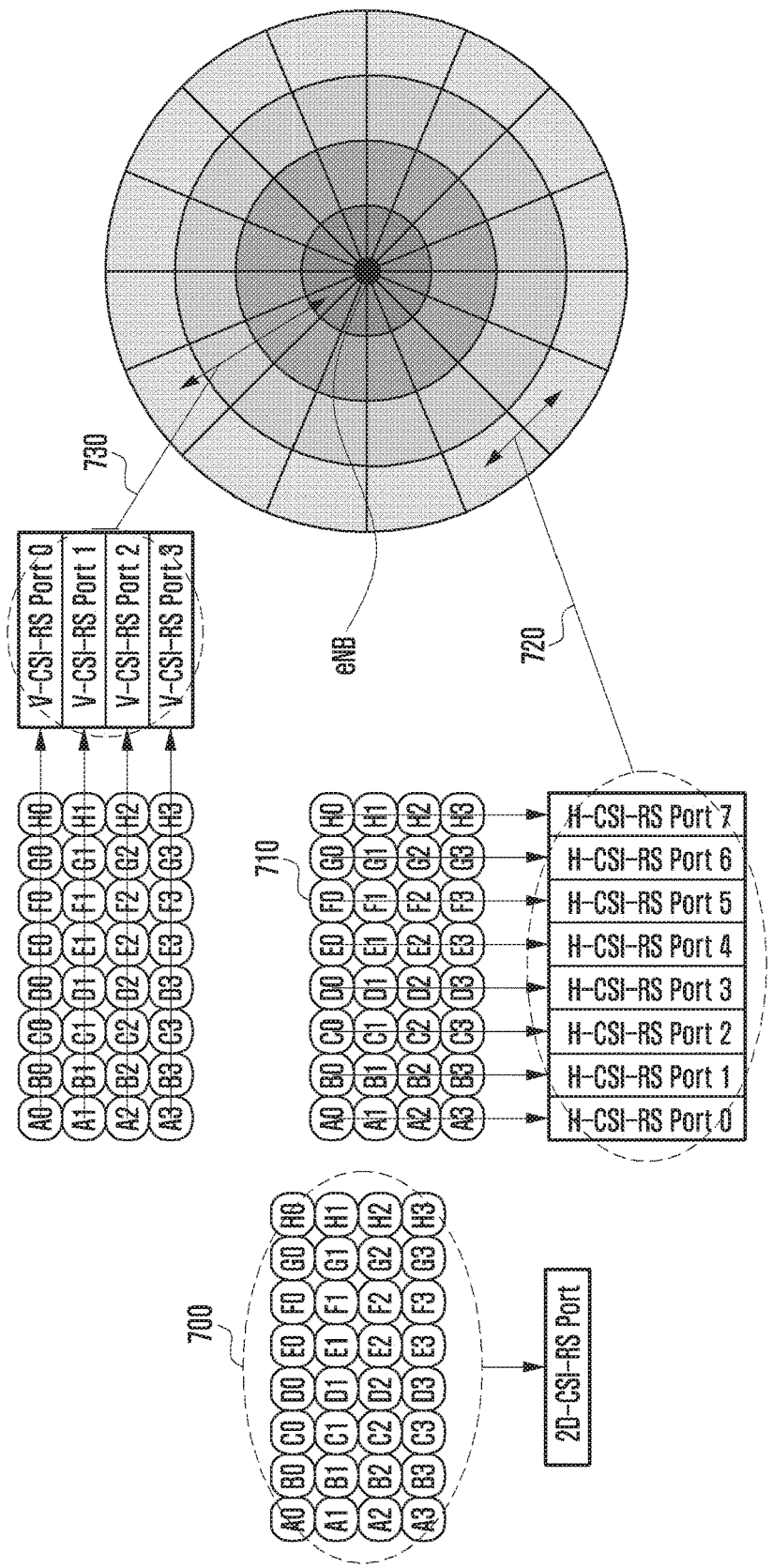
FIG. 7 is a diagram showing a method for transmitting a reference signal according to the present disclosure.

FIG. 7 is a diagram showing a method for transmitting a reference signal according to the present disclosure.

Generally, like the FD-MIMO, when the number of transmission antennas is many, the base station needs to transmit the reference signal (hereinafter, CSI-RS) in proportion to the number of transmission antennas. For example, when eight transmission antennas are used in the LTE/LTE-A, the base station may measure the downlink channel state by transmitting the CSI-RSs corresponding to eight antenna ports (8-port) to the terminal.

In this case, in order for the base station to transmit the CSI-RSs corresponding to 8 ports (8-ports), the radio resources consisting of 8 REs as shown in A and B of FIG. 2 may be used in one resource block (RB). As such, when the CSI-RS transmission is applied to FD-MIMO, the radio resources proportional to the number of transmission antennas need to be allocated to the CSI-RS. That is, when the number of transmission antennas of the base station is 128, the base station needs to transmit the CSI-RS using a total of 128 REs within one RB. The CSI-RS transmission method may increase the accuracy of the channel measurement between the antennas but requires the excessive radio resources, and therefore has an adverse effect of reducing radio resources required for wireless data transmission and reception. Therefore, considering the advantages and disadvantages, the base station having a large number of transmission antennas like the FD-MIMO may consider the following two methods for transmitting the CSI-RS.

CSI-RS transmission method 1: A method of allocating radio resources corresponding to the number of antennas to CSI-RS and transmitting the allocated radio resources.

CSI-RS transmission method 2: Method of separating CSI-RS into plural dimensions and transmitting the separated CSI-RS In FIG. 7, the base station operating the FD-MIMO may include a total of 32 antennas. However, the scope of the present disclosure is not limited thereto, and the base station may include 32 or more or 32 or less antennas.

A first antenna group 700 of FIG. 7 is a method for transmitting CSI-RS by allocating radio resources corresponding to the number of antennas using the CSI-RS transmission method 1. 32 antennas of the first antenna group 700 may be represented by A0, . . . , A3, B0, . . . , B3, C0, . . . , C3, D0, . . . , D3, E0, . . . , E3, F0, . . . , F3, G0, . . . , G3, and H0, . . . , H3.

The 32 antennas of the first antenna group 700 may be transmitted as one two-dimensional CSI-RS (hereinafter, referred to as 2D-CSI-RS), and the 2D-CSI-RS for measuring channel states of antennas in all horizontal and vertical directions The 2D-CSI-RS for measuring the channel condition may include 32 antenna ports. The method may increase the accuracy of the channel information because it allocates all the radio resources to each antenna, but may not be effective in terms of resource efficiency because it uses a relatively large amount of radio resources for control information and data.

Meanwhile, a second antenna group 710 of FIG. 7 is for explaining the CSI-RS transmission method 2. The CSI-RS transmission method 2 is a method for performing, by a terminal, channel measurement for a large number of transmission antennas while allocating a relatively smaller number of radio resources even if it generates relatively lower channel information.

The CSI-RS transmission method 2 is a method for separating and transmitting the whole CSI-RS into N dimensions. For example, when the transmission antenna of the base station are arranged in two dimensions as shown in FIG. 1, the CSI-RS may be separated into two dimensions and transmitted. In this case, one CSI-RS is operated in a horizontal direction CSI-RS (hereinafter referred to as H-CSI-RS) for measuring horizontal channel information, and the other CSI-RS is operated in a vertical direction CSI-RS (hereinafter referred to as V-CSI-RS) for measuring vertical channel information.

In FIG. 7, like the first transmission method 300, 32 antennas of the second antenna group 710 may be represented by A0, . . . , A3, B0, . . . , B3, C0, . . . , C3, D0, . . . , D3, E0, . . . , E3, F0, . . . , F3, G0, . . . , G3, and H0, . . . , H3. In addition, the 32 antennas of FIG. 7 may be transmitted to the two CSI-RSs. In this case, the H-CSI-RS measuring the horizontal channel state may include the following 8 antenna ports.

H-CSI-RS port 0: Configured by combining antennas A0, A1, A2, and A3

H-CSI-RS port 1: Configured by combining antennas B0, B1, B2, and B3

H-CSI-RS port 2: Configured by combining antennas C0, C1, C2, and C3

H-CSI-RS port 3: Configured by combining antennas D0, D1, D2, and D3

H-CSI-RS port 4: Configured by combining antennas E0, E1, E2, and E3

H-CSI-RS port 5: Configured by combining antennas F0, F1, F2, and F3

H-CSI-RS port 6: Configured by combining antennas G0, G1, G2, and G3

H-CSI-RS port 7: Configured by combining antenna H0, H1, H3, and H3

Generating one CSI-RS port by combining the plurality of antennas means antenna virtualization and may be generally made by a linear combination of the plurality of antennas.

Further, the V-CSI-RS measuring the vertical channel state may include the following 4 antenna ports.

V-CSI-RS port 0: Configured by combining antennas A0, B0, C0, D0, E0, F0, G0, and H0

V-CSI-RS port 1: Configured by combining antennas A1, B1, C1, D1, E1, F1, G1, and H1

V-CSI-RS port 2: Configured by combining antennas A2, B2, C2, D2, E2, F2, G2, and H2

V-CSI-RS port 3: Configured by combining antennas A3, B3, C3, D1, E3, F3, G3, and H3

As described above, when the plurality of antennas are arrayed two dimensionally in MsN (vertical direction s horizontal direction), the terminal may measure the channel of the FD-MIMO by using N horizontal CSI-RS ports and M vertical CSI-RS ports. That is, when the two CSI-RSs are used, the terminal may figure out the channel state information by using M+N CSI-RS ports for MsN transmission antennas.

As such, the CSI-RS overhead can be reduced by the method for figuring out information on a larger number of transmission antennas using a smaller number of CSI-RS ports. The CSI-RS transmission method 1 may figure out the channel information on the transmission antenna of the FD-MIMO by using MsN=K CSI-RSs, and the approach may be similarly applied even when two CSI-RSs are used.

Although the present disclosure has been described on the assumption of the CSI-RS transmission method 1, it is apparent to those skilled in the art that the CSI-RS transmission method 2 may be similarly extended, applied, and used.

In addition, the following abbreviations may be used to describe the present disclosure.

Rank indicator (RIHV): It may refer to a rank indicator of a channel obtained by simultaneously applying the horizontal and vertical precoding to the 2D-CSI-RS. The rank indicator may be notified to the base station by the terminal or may be determined by a predetermined rule. First PMI (PMI1, W1): It may refer to a first precoding matrix indicator informed that the terminal notifies to the base station by obtaining optimal precoding based on the channel state which is obtained by applying the 2D precoding to the 2D-CSI-RS. The first precoding matrix indicator may represent a beam group selected in horizontal and vertical directions.

First PMI-1 (PMI1H, W11, first PMI of first dimension): It may refer to a first precoding matrix indicator informed that the terminal notifies to the base station by obtaining optimal precoding based on the channel state which is obtained by applying the horizontal precoding to the 2D-CSI-RS or the channel state which is obtained by measuring the horizontal CSI-RS (H-CSI-RS). PMI1H may represent a beam group selected in the horizontal direction. In addition, it may also be parameters of an independent codebook or may be bits of some of the PMI1 bit payloads. In the present disclosure, it may be called the first PMI of the first dimension, the first PMI in the horizontal direction, and the like.

First PMI-2 (PMI1V, W12, first PMI of second dimension): It may refer to a first precoding matrix indicator informed that the terminal notifies to the base station by obtaining optimal precoding based on the channel state which is obtained by applying the vertical precoding to the 2D-CSI-RS or the channel state which is obtained by measuring the vertical CSI-RS (V-CSI-RS). PMI1V may represent a beam group selected in the vertical direction. In addition, it may also be parameters of an independent codebook or may be bits of some of the PMI1 bit payloads. In the present disclosure, it may be called the first PMI of the second dimension, the first PMI in the vertical direction, and the like.

Second PMI (PMI2, W2): It may refer to a second precoding matrix indicator informed that the terminal notifies to the base station by obtaining optimal precoding based on the channel state which is obtained by applying the 2D precoding to the 2D-CSI-RS. The second precoding matrix indicator may represent co-phasing required to correct a phase difference between antennas having different polarization from a beam selected from the beam groups selected in the horizontal and vertical directions.

Second PMI-1 (PMI2H, W21, second PMI of first dimension): It may refer to a second precoding matrix indicator informed that the terminal notifies to the base station by obtaining optimal precoding based on the channel state which is obtained by applying the horizontal precoding to the 2D-CSI-RS or the channel state which is obtained by measuring the horizontal CSI-RS (H-CSI-RS). The PMI2H may represent a beam selected from the beam groups selected in the horizontal direction, may be the parameter of the independent codebook, or may be bits of some of the PMI2 bit payloads. In the present disclosure, it may be called the second PMI of the first dimension, the second PMI in the horizontal direction, and the like.

Second PMI-2 (PMI2V, W22, second PMI of second dimension): It may refer to a second precoding matrix indicator informed that the terminal notifies to the base station by obtaining optimal precoding based on the channel state which is obtained by applying the vertical precoding to the 2D-CSI-RS or the channel state which is obtained by measuring the vertical CSI-RS (V-CSI-RS). PMI2V may represent a beam selected from the beam groups selected in the vertical direction. In addition, it may also be parameters of an independent codebook or may be bits of some of the PMI2 bit payloads. In the present disclosure, it may be called the second PMI of the second dimension, the second PMI in the vertical direction, and the like.

Second PMI-3 (PMI2C, W23): It may refer to a second precoding matrix indicator informed that the terminal notifies to the base station by obtaining optimal precoding based on the channel state which is obtained by applying the 2D precoding to the 2D-CSI-RS. The PMI2C may include bits for indicating the co-phasing required to correct the phase difference between antennas having different polarization when using the beam selected in the PMI1. In addition, it may also be parameters of the independent codebook or may be bits of some of the PMI2 bit payloads.

Channel quality information (CQIHV): It can mean the data rate that can be supported by the generated terminal under the assumption that 2D precoding is applied at the same time.

On the other hand, a structure of a 2D codebook can be expressed by the following equation.

$$W=(W_{11}WW_{12})W_2=W_1W_2 \quad \text{[Equation 1]}$$

In the above Equation 1, W1, W11, W12, and W2 may each represent PMI1, PMI1H, PMI1V, and PMI2. At this time, the PMI and the PMI1V may be included in the codebook directly or indirectly. In addition, the second PMI (PMI2) represented by W2 may also include PMI2H, PMI2V, PMI2C directly or indirectly. The following Table 5 shows an example of representing a rank1 2D codebook using 16 antenna ports by using the 2D codebook structure.

TABLE 5

Example 1 of master codebook for 1-layer CSI reporting using 16 antenna ports

| $i_1$ | $i_2$ = 0 | $i_2$ = 1 | $i_2$ = 2 | $i_2$ = 3 |
|---|---|---|---|---|
| 0–255 | $W^{(1)}_{2i_{1a},i_{1b},0}$ | $W^{(1)}_{2i_{1a},i_{1b},8}$ | $W^{(1)}_{2i_{1a},i_{1b},16}$ | $W^{(1)}_{2i_{1a},i_{1b},24}$ |

| $i_1$ | $i_2$ = 4 | $i_2$ = 5 | $i_2$ = 6 | $i_2$ = 7 |
|---|---|---|---|---|
| 0–255 | $W^{(1)}_{2i_{1a},i_{1b},0}$ | $W^{(1)}_{2i_{1a},i_{1b},8}$ | $W^{(1)}_{2i_{1a},i_{1b},16}$ | $W^{(1)}_{2i_{1a},i_{1b},24}$ |

| $i_1$ | $i_2$ = 8 | $i_2$ = 9 | $i_2$ = 10 | $i_2$ = 11 |
|---|---|---|---|---|
| 0–255 | $W^{(1)}_{2i_{1a}+1,i_{1b},0}$ | $W^{(1)}_{2i_{1a}+1,i_{1b},8}$ | $W^{(1)}_{2i_{1a}+1,i_{1b},16}$ | $W^{(1)}_{2i_{1a}+1,i_{1b},24}$ |

| $i_1$ | $i_2$ = 12 | $i_2$ = 13 | $i_2$ = 14 | $i_2$ = 15 |
|---|---|---|---|---|
| 0–255 | $W^{(1)}_{2i_{1a}+1,i_{1b},0}$ | $W^{(1)}_{2i_{1a}+1,i_{1b},8}$ | $W^{(1)}_{2i_{1a}+1,i_{1b},16}$ | $W^{(1)}_{2i_{1a}+1,i_{1b},24}$ |

| $i_1$ | $i_2$ = ... | $i_2$ = 25 | $i_2$ = 26 | $i_2$ = 27 |
|---|---|---|---|---|
| 0–255 | ... | $W^{(1)}_{2i_{1a}+3,i_{1b},8}$ | $W^{(1)}_{2i_{1a}+3,i_{1b},16}$ | $W^{(1)}_{2i_{1a}+3,i_{1b},24}$ |

| $i_1$ | $i_2$ = 28 | $i_2$ = 29 | $i_2$ = 30 | $i_2$ = 31 |
|---|---|---|---|---|
| 0–255 | $W^{(1)}_{2i_{1a}+3,i_{1b},0}$ | $W^{(1)}_{2i_{1a}+3,i_{1b},8}$ | $W^{(1)}_{2i_{1a}+3,i_{1b},16}$ | $W^{(1)}_{2i_{1a}+3,i_{1b},24}$ |

| $i_1$ | $i_2$ = 32 | $i_2$ = 33 | $i_2$ = 34 | $i_2$ = 35 |
|---|---|---|---|---|
| 0–255 | $W^{(1)}_{2i_{1a},i_{1b}+8,0}$ | $W^{(1)}_{2i_{1a},i_{1b}+8,8}$ | $W^{(1)}_{2i_{1a},i_{1b}+8,16}$ | $W^{(1)}_{2i_{1a},i_{1b}+8,24}$ |

| $i_1$ | $i_2$ = 36 | $i_2$ = 37 | $i_2$ = 38 | $i_2$ = 39 |
|---|---|---|---|---|
| 0–255 | $W^{(1)}_{2i_{1a},i_{1b}+8,2}$ | $W^{(1)}_{2i_{1a},i_{1b}+8,10}$ | $W^{(1)}_{2i_{1a},i_{1b}+8,18}$ | $W^{(1)}_{2i_{1a},i_{1b}+8,26}$ |

| $i_1$ | $i_2$ = ... | $i_2$ = 65 | $i_2$ = 66 | $i_2$ = 67 |
|---|---|---|---|---|
| 0–255 | ... | $W^{(1)}_{2i_{1a},i_{1b}+16,8}$ | $W^{(1)}_{2i_{1a},i_{1b}+16,16}$ | $W^{(1)}_{2i_{1a},i_{1b}+16,24}$ |

| $i_1$ | $i_2$ = 68 | $i_2$ = 69 | $i_2$ = 70 | $i_2$ = 71 |
|---|---|---|---|---|
| 0–255 | $W^{(1)}_{2i_{1a},i_{1b}+16,4}$ | $W^{(1)}_{2i_{1a},i_{1b}+16,12}$ | $W^{(1)}_{2i_{1a},i_{1b}+16,20}$ | $W^{(1)}_{2i_{1a},i_{1b}+16,28}$ |

| $i_1$ | $i_2$ = ... | $i_2$ = 121 | $i_2$ = 122 | $i_2$ = 123 |
|---|---|---|---|---|
| 0–255 | ... | $W^{(1)}_{2i_{1a}+3,i_{1b}+24,8}$ | $W^{(1)}_{2i_{1a}+3,i_{1b}+24,16}$ | $W^{(1)}_{2i_{1a}+3,i_{1b}+24,24}$ |

| $i_1$ | $i_2$ = 124 | $i_2$ = 125 | $i_2$ = 126 | $i_2$ = 127 |
|---|---|---|---|---|
| 0–255 | $W^{(1)}_{2i_{1a}+3,i_{1b}+24,6}$ | $W^{(1)}_{2i_{1a}+3,i_{1b}+24,14}$ | $W^{(1)}_{2i_{1a}+3,i_{1b}+24,22}$ | $W^{(1)}_{2i_{1a}+3,i_{1b}+24,30}$ | where $$W^{(1)}_{p,p',q} = \frac{1}{\sqrt{16}} \begin{bmatrix} v''_{p,p'} \\ \varphi_q v''_{p,p'} \end{bmatrix}, \quad i_{1a} = i_1 \bmod 16, \quad i_{1b} = \lfloor i_1/16 \rfloor, \text{ and } \varphi_q = e^{j2\pi q/32}$$

The codebook exemplified in the above Table 5 is a codebook table prepared on the assumption of W1 (i1) 8 bit and W2 (i2) 7 bit. W1 may consist of W11 ($i_{1a}$) of 4 bits and W12 ($i_{ib}$) of 4 bits. In order to express this by W1 of 8 bits, the following Equation 2 may be used.

$$W_1 = 16 W_{11} + W_{12} \quad \text{[Equation 2]}$$

When the above Equation 2 and the codebook table are used, the terminal can perform the beam group selection operation in the first and second dimensions as described above. In the above table, although W2 is not directly written unlike the W1, the W2 may consist of W21 of 2 bits, W22 of 2 bits, and W23 of 3 bits, and may be expressed by the following Equation 3.

$$W_2 = 32 W_{21} + 8 W_{22} + W_{23} \quad \text{[Equation 3]}$$

Therefore, even if it is not exactly specified in the codebook, it is possible to extract the corresponding W11 (PMI1H), W12 (PMI1V) and W21 (PMI2H), W22 (PMI2V), W23 (PMI2C) from the first PMI (W1) and the second PMI (W2) based on the bit configuration. The following Table 6 below is an example of a subsampling table specified for the terminal to divide and report each dimension using codebook subsampling based on the codebook exemplified in the above Table 5.

TABLE 6

| Rank-1 codebook subsampling for 16Tx (Ma = 2, Na = 4, P = 2) | | | | |
|---|---|---|---|---|
| Value of the first PMI part a $I_{PMI1a}$ | Codebook index $i_{1a}$ | Value of the second PMI $I_{PMI2}$ | Codebook index $i_{2a}$ | Codebook index $i_{2c}$ |
| 0-15 | $I_{PMI1a}$ | 0-15 | $\lfloor I_{PMI2}/4 \rfloor$ | $I_{PMI2}\bmod 4$ |

TABLE 6-continued

| Rank-1 codebook subsampling for 16Tx (Ma = 2, Na = 4, P = 2) | | | |
|---|---|---|---|
| Value of the first PMI part b $I_{PMI1b}$ | Codebook index $i_{1b}$ | Value of the first PMI part b $I_{PMI1b}$ | Codebook index $i_{2b}$ |
| 0-15 | $2\lfloor I_{PMI1b}/4 \rfloor$ | 0-15 | $I_{PMI1b}\bmod 4$ |

Referring to the above Table 6, a horizontal codebook (beam group) index $i_{1a}$ is determined by a first part $I_{PMI1a}$ (4 bits) of the first PMI and a horizontal beam selection $i_{2a}$ and co-phasing $i_{2c}$ are also determined by a second PMI $I_{PMI2}$ consisting of 4 bits. In this case, the $i_{2a}$ may select one of four horizontal beams selected by the $i_{1a}$ and $i_{2c}$ may be limited to select one of the fixed values of $\{1, j, -1, -j\}$ as the co-phasing (in other words, the co-phasing is not a function for the beam selection but may be determined independently) in consideration of horizontal beam characteristics.

Meanwhile, the vertical codebook (beam group) index $i_{1b}$ and the vertical beam selection $i_{2b}$ may be determined by the second part $I_{PMI1b}$ (4 bits) of the first PMI.

The following Table 7 shows another example of rank1 2D codebook using 16 antenna ports. FIG. 7 may be configured by making the number of bits of the first PMI and the second PMI different from those exemplified above.

TABLE 7

Example 2 of master codebook for 1-layer CSI reporting using 16 antenna ports

| | $i_2$ | | | |
|---|---|---|---|---|
| $i_1$ | 0 | 1 | 2 | 3 |
| 0-128 | $W^{(1)}_{2i_{1a},i_{1b},0}$ | $W^{(1)}_{2i_{1a},i_{1b},8}$ | $W^{(1)}_{2i_{1a},i_{1b},16}$ | $W^{(1)}_{2i_{1a},i_{1b},24}$ |

| | $i_2$ | | | |
|---|---|---|---|---|
| $i_1$ | 4 | 5 | 6 | 7 |
| 0-128 | $W^{(1)}_{2i_{1a}+1,i_{1b},0}$ | $W^{(1)}_{2i_{1a}+1,i_{1b},8}$ | $W^{(1)}_{2i_{1a}+1,i_{1b},16}$ | $W^{(1)}_{2i_{1a}+1,i_{1b},24}$ |

| | $i_2$ | | | |
|---|---|---|---|---|
| $i_1$ | 8 | 9 | 10 | 11 |
| 0-128 | $W^{(1)}_{2i_{1a}+2,i_{1b},0}$ | $W^{(1)}_{2i_{1a}+2,i_{1b},8}$ | $W^{(1)}_{2i_{1a}+2,i_{1b},16}$ | $W^{(1)}_{2i_{1a}+2,i_{1b},24}$ |

| | $i_2$ | | | |
|---|---|---|---|---|
| $i_1$ | 12 | 13 | 14 | 15 |
| 0-128 | $W^{(1)}_{2i_{1a}+3,i_{1b},0}$ | $W^{(1)}_{2i_{1a}+3,i_{1b},8}$ | $W^{(1)}_{2i_{1a}+3,i_{1b},16}$ | $W^{(1)}_{2i_{1a}+3,i_{1b},24}$ |

| | $i_2$ | | | |
|---|---|---|---|---|
| $i_1$ | 16 | 17 | 18 | 19 |
| 0-128 | $W^{(1)}_{2i_{1a},i_{1b}+8,0}$ | $W^{(1)}_{2i_{1a},i_{1b}+8,8}$ | $W^{(1)}_{2i_{1a},i_{1b}+8,16}$ | $W^{(1)}_{2i_{1a},i_{1b}+8,24}$ |

TABLE 7-continued

Example 2 of master codebook for 1-layer CSI reporting using 16 antenna ports

| $i_1$ | $i_2$ = 20 | 21 | 22 | 23 |
|---|---|---|---|---|
| 0-128 | $W^{(1)}_{2i_{1a}+1,i_{1b}+8,0}$ | $W^{(1)}_{2i_{1a}+1,i_{1b}+8,8}$ | $W^{(1)}_{2i_{1a}+1,i_{1b}+8,16}$ | $W^{(1)}_{2i_{1a}+1,i_{1b}+8,24}$ |

| $i_1$ | $i_2$ = 24 | 25 | 26 | 27 |
|---|---|---|---|---|
| 0-128 | $W^{(1)}_{2i_{1a}+2,i_{1b}+8,0}$ | $W^{(1)}_{2i_{1a}+2,i_{1b}+8,8}$ | $W^{(1)}_{2i_{1a}+2,i_{1b}+8,16}$ | $W^{(1)}_{2i_{1a}+2,i_{1b}+8,24}$ |

| $i_1$ | $i_2$ = 28 | 29 | 30 | 31 |
|---|---|---|---|---|
| 0-128 | $W^{(1)}_{2i_{1a}+3,i_{1b}+8,0}$ | $W^{(1)}_{2i_{1a}+3,i_{1b}+8,8}$ | $W^{(1)}_{2i_{1a}+3,i_{1b}+8,16}$ | $W^{(1)}_{2i_{1a}+3,i_{1b}+8,24}$ |

| $i_1$ | $i_2$ = 32 | 33 | 34 | 35 |
|---|---|---|---|---|
| 0-128 | $W^{(1)}_{2i_{1a},i_{1b}+16,0}$ | $W^{(1)}_{2i_{1a},i_{1b}+16,8}$ | $W^{(1)}_{2i_{1a},i_{1b}+16,16}$ | $W^{(1)}_{2i_{1a},i_{1b}+16,24}$ |

| $i_1$ | $i_2$ = 36 | 37 | 38 | 39 |
|---|---|---|---|---|
| 0-128 | $W^{(1)}_{2i_{1a}+1,i_{1b}+16,0}$ | $W^{(1)}_{2i_{1a}+1,i_{1b}+16,8}$ | $W^{(1)}_{2i_{1a}+1,i_{1b}+16,16}$ | $W^{(1)}_{2i_{1a}+1,i_{1b}+16,24}$ |

| $i_1$ | $i_2$ = 40 | 41 | 42 | 43 |
|---|---|---|---|---|
| 0-128 | $W^{(1)}_{2i_{1a}+2,i_{1b}+16,0}$ | $W^{(1)}_{2i_{1a}+2,i_{1b}+16,8}$ | $W^{(1)}_{2i_{1a}+2,i_{1b}+16,16}$ | $W^{(1)}_{2i_{1a}+2,i_{1b}+16,24}$ |

| $i_1$ | $i_2$ = 44 | 45 | 46 | 47 |
|---|---|---|---|---|
| 0-128 | $W^{(1)}_{2i_{1a}+3,i_{1b}+16,0}$ | $W^{(1)}_{2i_{1a}+3,i_{1b}+16,8}$ | $W^{(1)}_{2i_{1a}+3,i_{1b}+16,16}$ | $W^{(1)}_{2i_{1a}+3,i_{1b}+16,24}$ |

| $i_1$ | $i_2$ = 48 | 49 | 50 | 51 |
|---|---|---|---|---|
| 0-128 | $W^{(1)}_{2i_{1a},i_{1b}+24,0}$ | $W^{(1)}_{2i_{1a},i_{1b}+24,8}$ | $W^{(1)}_{2i_{1a},i_{1b}+24,16}$ | $W^{(1)}_{2i_{1a},i_{1b}+24,24}$ |

| $i_1$ | $i_2$ = 52 | 53 | 54 | 55 |
|---|---|---|---|---|
| 0-128 | $W^{(1)}_{2i_{1a}+1,i_{1b}+24,0}$ | $W^{(1)}_{2i_{1a}+1,i_{1b}+24,8}$ | $W^{(1)}_{2i_{1a}+1,i_{1b}+24,16}$ | $W^{(1)}_{2i_{1a}+1,i_{1b}+24,24}$ |

| $i_1$ | $i_2$ = 56 | 57 | 58 | 59 |
|---|---|---|---|---|
| 0-128 | $W^{(1)}_{2i_{1a}+2,i_{1b}+24,0}$ | $W^{(1)}_{2i_{1a}+2,i_{1b}+24,8}$ | $W^{(1)}_{2i_{1a}+2,i_{1b}+24,16}$ | $W^{(1)}_{2i_{1a}+2,i_{1b}+24,24}$ |

| $i_1$ | $i_2$ = 60 | 61 | 62 | 63 |
|---|---|---|---|---|
| 0-128 | $W^{(1)}_{2i_{1a}+3,i_{1b}+24,0}$ | $W^{(1)}_{2i_{1a}+3,i_{1b}+24,8}$ | $W^{(1)}_{2i_{1a}+3,i_{1b}+24,16}$ | $W^{(1)}_{2i_{1a}+3,i_{1b}+24,24}$ |

Where $$W^{(1)}_{p,p',q} = \frac{1}{\sqrt{16}} \begin{bmatrix} v''_{p,p'} \\ \varphi_q v''_{p,p'} \end{bmatrix}, \quad i_{1a} = i_1 \bmod 16, \quad i_{1b} = \lfloor i_1/16 \rfloor, \text{ and } \varphi_q = e^{j2\pi q/32}$$

The codebook exemplified in the above Table 7 is a codebook table prepared on the assumption of W1 (i1) 7 bit and W2 (i2) 6 bit. W1 may consist of W11 ($i_{1a}$) of 4 bits and W12 ($i_{1b}$) of 3 bits. In order to express this by W1 of 7 bits, the following Equation 4 may be used.

$$W_1 = 16W_{11} + W_{12} \quad \text{[Equation 4]}$$

When the above Equation 4 and the codebook table are used, it is possible to perform the beam group selection operation in the first and second dimensions as described above. In the above table, although W2 is not directly written unlike the W1, the W2 may consist of W21 of 2 bits, W22 of 2 bits, and W23 of 2 bits, and may be expressed by the following Equation 5.

$$W_2 = 16W_{21} + 4W_{22} + W_{23} \quad \text{[Equation 5]}$$

Therefore, like the codebook as described above, even if the corresponding codebook is not exactly specified in the codebook as well, it is possible to extract the corresponding W11 (PMI1H), W12 (PMI1V) and W21 (PMI2H), W22 (PMI2V), W23 (PMI2C) from the first PMI (W1) and the second PMI (W2) based on the bit configuration.

The following Table 8 below is an example of a subsampling table specified for the terminal to divide and report each dimension using codebook subsampling based on the codebook exemplified in the above Table 7.

TABLE 8

Rank-1 codebook subsampling for 16Tx (Ma = 4, Na = 2, P = 2)

| Value of the first PMI part a $I_{PMI1a}$ | Codebook index $i_{1a}$ | Value of the first PMI part a $I_{PMI1a}$ | Codebook index $i_{2a}$ |
|---|---|---|---|
| 0-15 | $I_{PMI2a}$ | 0-15 | 0 |

| Value of the first PMI part b $I_{PMI1b}$ | Codebook index $i_{1b}$ | Value of the second PMI $I_{PMI2}$ | Codebook index $i_{2b}$ | Codebook index $i_{2c}$ |
|---|---|---|---|---|
| 0-15 | $I_{PMI2b}$ | 0-15 | $2\lfloor I_{PMI2}/4 \rfloor$ | $(I_{PMI2} \bmod 4) + 4$ |

Referring to the above Table 8, a horizontal codebook (beam group) index $i_{1b}$ is determined by a second part $I_{PMI1b}$ (4 bits) of the first PMI and a horizontal beam selection $i_{2b}$ and co-phasing $i_{2c}$ may also be determined by a second PMI $I_{PMI2}$ consisting of 4 bits. In this case, the in selects one of the four horizontal beams selected by the $i1_b$ and the $i_{2c}$ may be limited to select $\alpha(i) = q^{2(i_{2b}-1)}$ as the co-phasing in consideration of the horizontal beam characteristics. (In other words, the co-phasing is not the function for the beam selection but may be determined independently) Meanwhile, the vertical codebook (beam group) index $i_{1a}$ and the vertical beam selection $i_{2a}$ may be determined by the first part $I_{PMI1a}$ (4 bits) of the first PMI.

The size of the RI and the CQI of the LTE Rel-11 supporting the PMI overhead and the rank 8 which can be appreciated from the above Tables 7 and 8 are each considered to be 3 bits and 4 bits (3 bits in the case of the differential CQI), it can be confirmed that in the FD-MIMO, the PMI overhead greatly increased like 15 bits or 13 bits as exemplified may be a problem in terms of computation complexity or overhead for reporting for the terminal to calculate the channel state report. Here, as described in the examples using the above Tables 7 and 8, the PMI of the horizontal dimension (first dimension) and the PMI of the vertical dimension (second dimension) which are used in the 2D codebook in which the horizontal dimension and the vertical dimension are considered together can be separated by using a plurality of independent codebook subsampling tables by dimension or the same codebook subsampling table. Accordingly, it is possible to reduce the overhead for the PMI reporting by determining this sequentially according to predetermined rules in a single feedback or determining reporting of which dimension the terminal itself transmits.

This is because the mobility between the base station and the terminal channel components is different in the horizontal dimension and the vertical dimension. For example, in the environment such as a building, there is a tendency that the terminal (intra-layer movement) moves fast in the case of the horizontal dimension, but the terminal little moves or is very slow in the case of the vertical dimension (inter-layer movement). This may be confirmed from system level simulation results of the following <Table 9>.

TABLE 9

Performance degradation according to PMIH and PMIV reporting period

| | Periodicity of change for PMIV. | | | | | |
|---|---|---|---|---|---|---|
| (8, 4, 2, 16) | 5 ms | 20 ms | 40 ms | 60 ms | 80 ms | 100 ms |
| Avg. Tput. (bps/Hz/cell) | Ref. | −1% | −4% | −7% | −9% | −11% |
| 5% Tput. (bps/Hz/UE) | Ref. | −6% | −9% | −9% | −14% | −17% |

| | Periodicity of change for PMIH. | | | | | |
|---|---|---|---|---|---|---|
| (8, 4, 2, 16) | 5 ms | 20 ms | 40 ms | 60 ms | 80 ms | 100 ms |
| Avg. Tput. (bps/Hz/cell) | Ref. | −2% | −6% | −11% | −14% | −16% |
| 5% Tput. (bps/Hz/UE) | Ref. | −6% | −3% | −10% | −35% | −30% |

It can be confirmed from the above results that when the terminal increases the PMI reporting period in the vertical dimension to 100 ms, the PMI of the vertical dimension only has a performance reduction effect of 11%, whereas the PMI of the horizontal dimension has a performance reduction effect to 16%. Therefore, if the terminal may report the channel state information of the horizontal dimension having the large performance reduction more frequently and report the channel state information of the vertical dimension less frequently, the performance of the terminal may be improved by reducing the codebook subsampling and the performance reduction of the terminal due to the reporting by dimension may also be minimized.

In the present disclosure, the above-mentioned horizontal and vertical dimensions may be written as the first dimension and the second dimension. In addition, in the present disclosure, the first dimension is written as the horizontal dimension and the second dimension is written as the vertical, dimension, which is merely an example for using the present disclosure. Therefore, it is possible to use the second dimension as the horizontal dimension and the first dimension as the vertical dimension, which is a problem of the base station and terminal implementation.

In addition, the present disclosure is described based on the codebooks shown in the above Tables 5 and 6, but the present disclosure is not necessarily based on the corresponding codebooks, and even the codebook designed for a similar operation can perform the same operation.

In addition, the example of the codebook shows that each codebook subsampling table is written to report the PMIs by dimension, but if each dimension uses the same number of bits, it is written using one table for each part and it is also possible to additionally write of which part the bit the corresponding PMI points to.

In order to allow the terminal to report the feedback information, the base station may transmit the feedback configuration information to the terminal. Therefore, the terminal may receive the feedback configuration information for the 2D-CSI-RS. In this case, the 2D-CSI-RS may be one signal specifying a plurality of CSI-RS ports, or may be a signal specifying a plurality of CSI-RS ports by combining a plurality of 2, 4, or 8-port CSI-RSs (resource configuration, subframe configuration). Thereafter, the terminal may receive one feedback configuration information through radio resource control (RRC) information, and examples of the feedback configuration information included in the RRC information include all the information shown in the following Table 10 or only some information shown in the following Table 10.

TABLE 10

Feedback Configuration Information

CSI-RS information: CSI-RS
Reporting mode
Feedback timing
PMI codebook information
Number of reporting using subsampling #1
Number of reporting using subsampling #2
Reporting offset between subsampling
First reporting subsampling configuration
DI enable
PMI assumption for initial CSI reporting
Etc . . .

In the above Table 10, the PMI codebook information may refer to the information on a set of possible precoding matrices that may be used for the corresponding feedback. If the PMI codebook information is not included in the RRC information for feedback, the terminal may use all predefined precoding matrices for the feedback.

The number of reporting using the number of reporting using subsampling #1 (hereinafter, information on the number of first reporting) and the number of reporting using the number of reporting using subsampling #2 (hereinafter, information on the number of second reporting) may refer to parameters for setting each of the number of times that the terminal reports using the subsampling #1 and #2. In addition, the reporting offset between subsampling may refer to parameters for specifying the reporting offset between the subsampling #1 and #2. The information on the number of first reporting and the information on the number of second reporting may be referred to as the information on the number of reporting.

Figure 8:
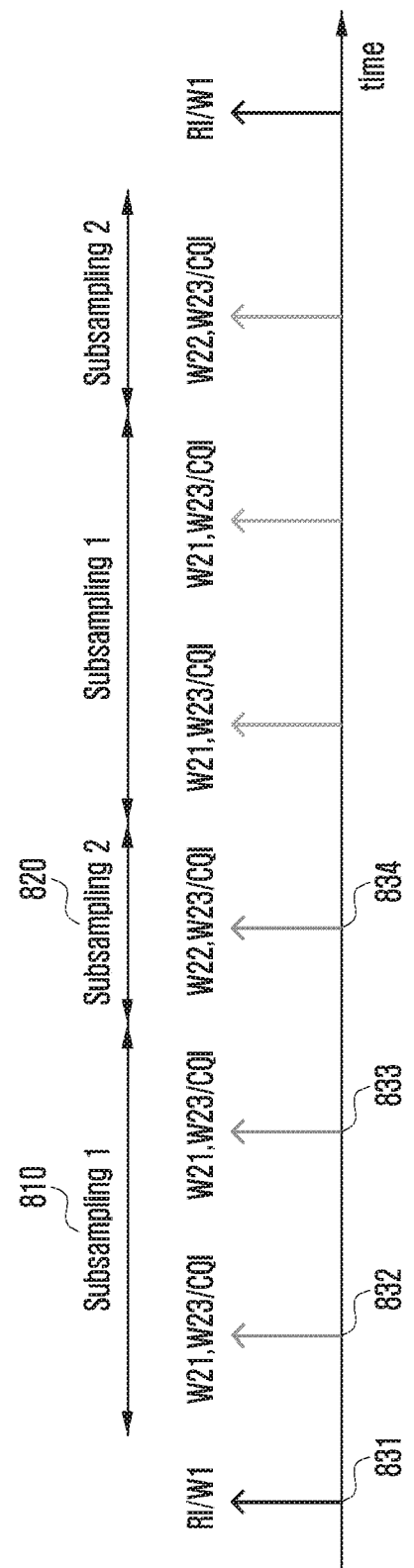
FIG. 8 is a diagram showing a method for transmitting channel state information according to a first embodiment of the present disclosure.

FIG. 8 is a diagram showing a method for transmitting channel state information according to a first embodiment of the present disclosure.

Specifically, in FIG. 8, the number of reporting using subsampling #1, the number of reporting using subsampling #2, and the reporting offset between subsampling may each be set to be 2, 1, and 0. FIG. 8 shows a process of allowing a terminal to transmit channel state information (RI, W11 (PMI1H), W12 (PMI1V) and W21 (PMI2H), W22 (PMI2V), W23 (PMI2C), CQI) using a CSI reporting mode such as the submode 1 of the current PUCCH mode 1-1.

The RI, the PMI, and the CQI are transmitted, having association with one another. That is, in the case of the subsampling 1, the RI may indicate of which rank the precoding matrix the PMI to be transmitted later points to. Further, when the base station transmits a signal at a rank which the RI specifies, in the case of applying the precoding matrix of the corresponding rank which the PMI specifies, the CQI may correspond to the data transmission rate that the terminal can receive or the value corresponding thereto.

When the corresponding subsampling is used, the terminal may report W21 (PMI2H) and W23 (PMI2C), which are the PMIs of the first dimension, every CSI reporting period in the case of the subsampling #1 810 and report W22 (PMI2V) and W23 (PMI2C), which are the PMIs of the second dimension, in the case of the subsampling #2 820. At this time, the PMI of the non-reported dimension may use the PMI of the corresponding dimension reported latest.

For example, a CQI 834 reported in the subsampling #2, 820 of FIG. 8 may be reported on the assumption of W22 and W23 834 and W21 833 and W1 831 previously reported. At this time, since terminal does not have the PMI of another dimension previously reported like the first reporting which performs the reporting using subsampling #1 810, two methods may be considered when the corresponding information is not used.

PMI assumption method 1 for dimension that is not reported: It uses a method for using a predefined PMI (specified as using one PMI in the standard)

PMI assumption method 2 for non-reported dimension: It is a method set by RRC

The PMI assumption method 1 for non-reported dimension is a method specifying the PMI of another dimension used in the corresponding case. For example, when the first reporting is performed using the subsampling #1 810, W22 is assumed to be 0. If the method is used, there may be an error in the PMI and CQI reporting because the first reporting should always perform the reporting on the assumption to be a specific PMI. This error may be solved by performing the reporting using subsampling #1 810 and subsampling #2 several times.

The PMI assumption method 2 of the non-reported dimension is a method for setting, by a base station, PMI of another dimension used in the corresponding case in the terminal. For example, when the terminal performs the first reporting using subsampling #1 810, the base station may set the W22 to be calculated on the assumption to be PMI n. This method has an advantage that the influence of the PMI and the CQI due to the PMI error may be minimized by presetting the PMI of the non-reported dimension to a certain extent in advance. The PMI assumption for initial CSI reporting in the above Table 10 may be used for the corresponding method, and if the PMI assumption method 1 is used, the corresponding field may not be necessary.

In FIG. 8, the terminal may transmit the RI and the first PMI. In addition, the terminal may perform the reporting based on the first codebook subsampling twice and the reporting based on the second codebook subsampling once by using the number of reporting using subsampling #1 and the number of reporting using subsampling #2.

Figure 9:
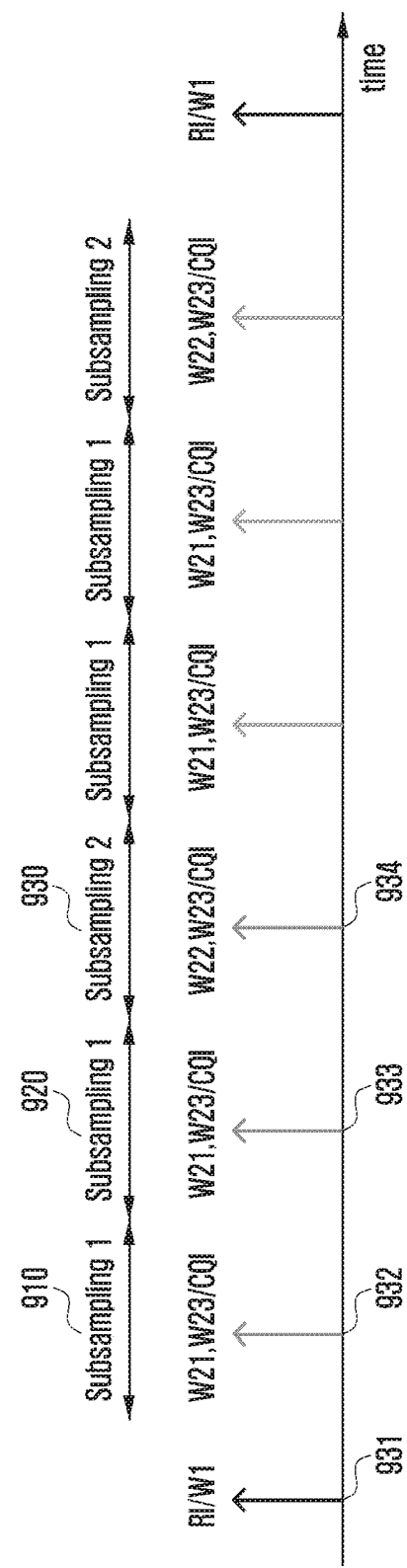
FIG. 9 is a diagram showing another method for transmitting channel state information according to a first embodiment of the present disclosure.

FIG. 9 is a diagram showing another method for transmitting channel state information according to a first embodiment of the present disclosure.

In detail, FIG. 9 shows a process of allowing the terminal to transmit the channel state information (RI, W11 (PMI1H), W12 (PMI1V) and W21 (PMI2H), W22 (PMI2V), W23 (PMI2C), CQI) using the CSI reporting mode such as the submode 1 of the current PUCCH mode 1-1 when the number of reporting using subsampling #1, and the number of reporting using subsampling #2, the reporting offset between subsampling each are 2, 1, and 1 for describing the reporting offset between subsampling.

In FIG. 9, the terminal may report the PMI and the CQI once using subsampling #1 910 and then the PMI and the CQI once using subsampling #2 920, by using the fact that the reporting offset between subsampling is 1.

Since the number of reporting using subsampling #1 and the number of reporting using subsampling #2 each are 2 and 1, the PMI and CQI reporting using the subsampling #1 is added once and then enters the next reporting period. At this time, the sum of the number of reporting using subsampling #1 and the number of reporting using subsampling #2 may be limited to coincide with the entire reporting period, and if not, cannot freely be set.

The first reporting subsampling configuration may be a parameter for setting whether the subsampling method to be first reported is the subsampling #1 910 or the subsampling #2 930. As described above, the first and second dimensions may be freely switched to the horizontal and vertical dimensions depending on the implementation of the base station and the terminal, such that the subsampling #1 may report the horizontal dimension or the vertical dimension. Therefore, it is possible to set signaling for prioritizing the reporting dimension by using one bit. If there is no such signaling, it can be set (specified in the standard) in advance so that the subsampling #1 is preferentially reported and the subsampling #2 is reported later.

Also, the method used in the existing periodic channel state reporting can be used by replacing the number of reporting using subsampling #1 and the number of reporting using subsampling #2. As described in the example, the periodic channel state reporting can use parameters such as $N_{pd}$, $M_{RI}$, J, H, H', K, $N_{OFFSET,CQI}$, and $N_{OFFSET,RI}$. At this time, the period of the first PMI may be defined as H'EN$_{pd}$, and the offset thereof may be defined as $N_{OFFSET,CQI}$. Here, H' may be transmitted as a higher signal. On the other hand, in the case in which the PTI is 1, the PTI may be transmitted along with the RI, the wCQI and the second PMI may be transmitted together, and the sCQI may be additionally fed back at a separate timing. In this case, the first PMI is not transmitted. The periods and the offsets of PTI and RI may be the same as the case in which the PTI is 0, and the period of the sCQI may be defined as $N_{pd}$ and the offset thereof may be defined as $N_{OFFSET,CQI}$. In this way, the method for defining and reporting the periods of the first PMI and the second PMI by subsampling may be another method for using the subsampling.

Meanwhile, dimension indicator enable (DI enable) information is 1-bit information set to use a dimension indicator (DI) that enables the terminal to determine and report the subsampling #1 and the subsampling #2. That is, when the DI enable information is set to be '1', it may mean the case in which the base station sets the dimension indicator so that the terminal uses the dimension indicator. Alternatively, when the DI enable information is included in the feedback configuration information, it may mean the case in which the base station sets the dimension indicator so that the terminal uses the dimension indicator. The detailed contents associated with the dimension indicator will be described below.

Figure 10:
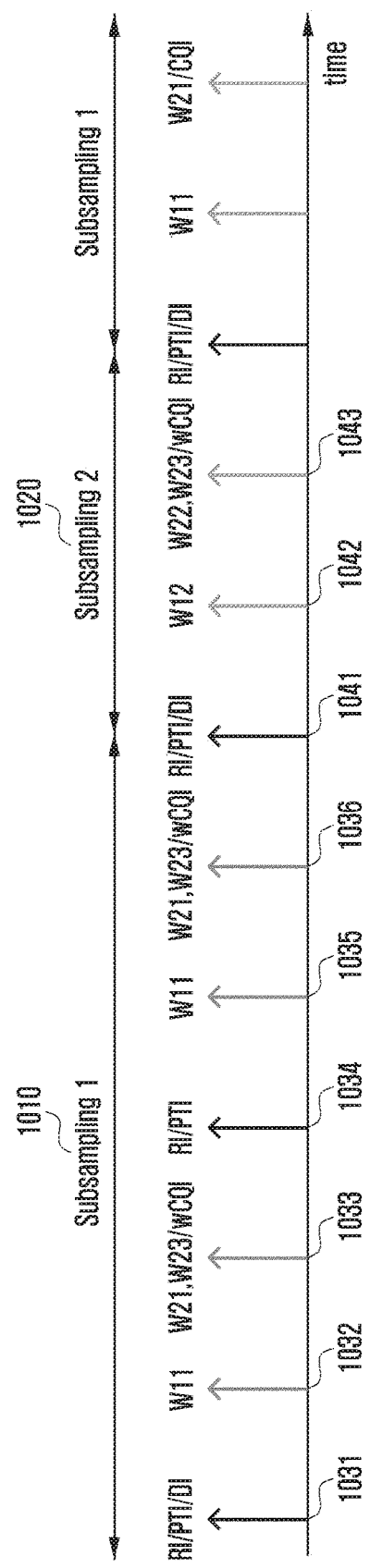
FIG. 10 is a diagram showing a process of transmitting channel state information using a dimension indicator (DI) according to a second embodiment of the present disclosure.

FIG. 10 is a diagram showing a process of transmitting channel state information using a dimension indicator (DI) according to a second embodiment of the present disclosure.

Referring to FIG. 10, if the DI feedback information is included in the feedback configuration information transmitted from the base station, the terminal may report the dimension indicator (DI) along with the RI and the PTI. The decision of the dimension indicator (DI) determines the codebook subsampling to be reported by the terminal itself such as the existing PTI and thus may perform the reporting using the subsampling suitable for the determined codebook subsampling.

The dimension indicator DI may be information consisting of 1 bit. The method for using the subsampling #1 in the case of 0, the subsampling #2 in the case of 1 and the like may be used. That is, the dimension indicator may refer to the information indicating the kind of subsampling determined to be more suitable for the channel state information reporting. The location where the dimension indicator (DI) is joint-encoded may be changed depending on the structure of the codebook and the structure of the codebook reporting, and the corresponding method will be described based on embodiments to be described later.

When the DI enable information is set, the setting such as the number of reporting using subsampling #1 and the number of reporting using subsampling #2 is not required, and even when the information is set, the terminal may not be operated according to the information. In addition, it may be set for the terminal to always use the dimension indicator (DI) without setting additional DI enable.

In the case of using the setting such as the number of reporting using subsampling #1 and the number of reporting using subsampling #2, the base station may report the reporting through each dimension by a certain number of times without giving the degree of freedom to the terminal, thereby simplifying implementation.

On the other hand, when the dimension indicator (DI) is used, the terminal itself may determine the dimension to be reported and thus may be operated adaptively. However, since the corresponding operation and implementation may become complicated and the dimension indicator (DI) needs to be reported additionally, the existing channel state reporting information such as the PMI and the CQI may be subsampled additionally. Therefore, a method for providing a field for setting this so that the base station can make its own decision is possible.

The dimension indicator (DI) may be represented in various expressions. As the meaning that the codebook subsampling is selected, it may be represented as various types of indexes such as a codebook subsampling indicator (CI) and a subsampling indicator (SI).

Referring to FIG. 10, the terminal may transmit RI, PTI, and DI 1031. At this time, when the subsampling for the RI is supported (or when the RI may be transmitted by dimension), the terminal may transmit the RI using subsampling #1. At this time, the terminal may use the DI 1031 to inform the base station that the channel state information is reported using the subsampling #1.

Next, the terminal may use the subsampling #1 1010 to transmit a first PMI (W11) 1032 and 1035 of a first dimension and second PMI (W21 and W23) and CQI 1033 and 1036 of the first dimension to the base station.

The terminal may then transmit the RI, PTI, DI 1041 using the subsampling #2 1020. At this time, the terminal may use the DI 1041 to inform the base station that the channel state information is reported using the subsampling #2.

Next, the terminal may use the subsampling #2 1020 to transmit a second PMI (W21) 1042 of a second dimension and second PMI (W22 and W23) and CQI 1043 and 1036 of the second dimension to the base station.

The method of reporting the channel state of each dimension using the codebook subsampling mentioned above may be changed depending on whether the PMI1H and the PMI1V mentioned above are reported together or separately. Such simultaneous reporting and separation reports may be changed depending on the structure of the 2D codebook and the PMI overhead. When the entire size of the PMI1 is not large and the structure of the corresponding 2D codebook is determined to be able to be reported at a time at the corresponding reporting period, if the PMI1H and the PMI1V may be reported together in the channel state reporting, the shorter the period for the channel state reporting, the faster the reporting of the channel state to the base station, such that the channel state information that is being changed rapidly can be reflected fast and the performance can be improved. However, the diversity of selecting the beam group is reduced, which can lead to performance degradation. On the other hand, when the PMI1H and the PMI1V are reported separately, more beam groups can be selected, which can lead to improve performance, but it is difficult to effectively cope with a channel that is changed rapidly in a short period of time because the channel state information reporting period becomes longer.

Meanwhile, the third embodiment is a method for using separation reporting by dimension of PMI reporting when the simultaneous reporting of the first PMI (PMI1V) of the first dimension and the first PMI (PMI1V) of the second dimension are used. In the present embodiment, the terminal may report the first PMI (PMI1H) of the first dimension and the first PMI (PMI1V) of the second dimension together and separately report only the second PMI (PMI2) by dimension using the codebook subsampling.

As described above, the PUCCH mode 1-1 is an operation for wideband reporting. In submode 1, the terminal may report the RI and the W1 together and may subsample the first PMI (W1) for this purpose. In addition, in submode 2, the terminal may report the W1, the W2, and the CQI together and may subsample both of the first PMI (W1) and the second PMI (W2) for this purpose. This operation will be described below with reference to FIG. 11 when being applied to the channel state reporting using the 2D codebook to which the first PMI (PMI1H) of the first dimension and the PMI (PMI1V) of the second dimension are reported together.

Figure 11A:
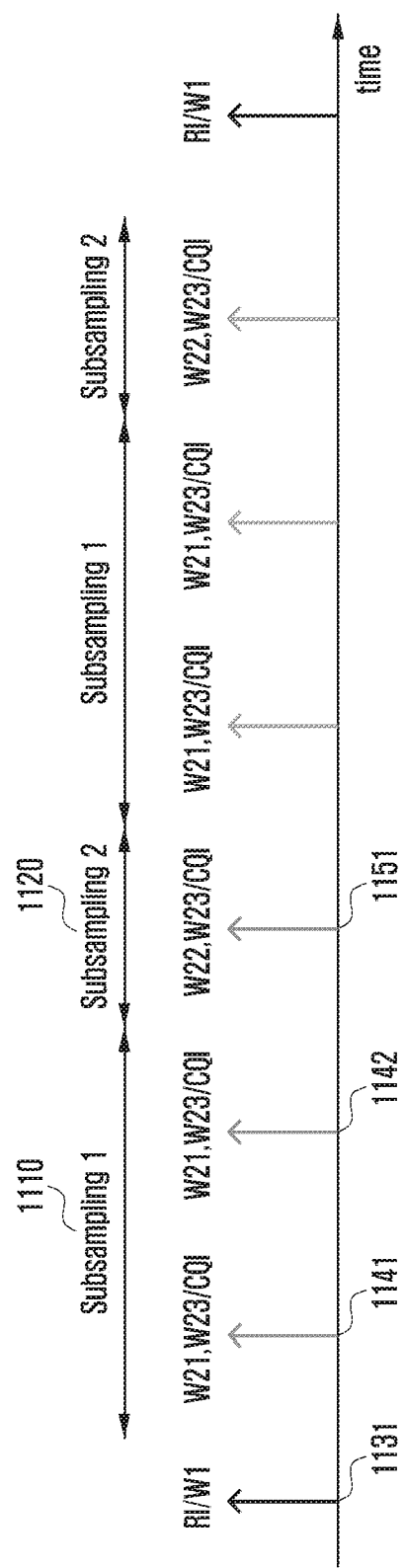
FIGS. 11A and 11B are diagrams showing a method for reporting a channel state of a terminal according to a third embodiment of the present disclosure.
Figure 11B:
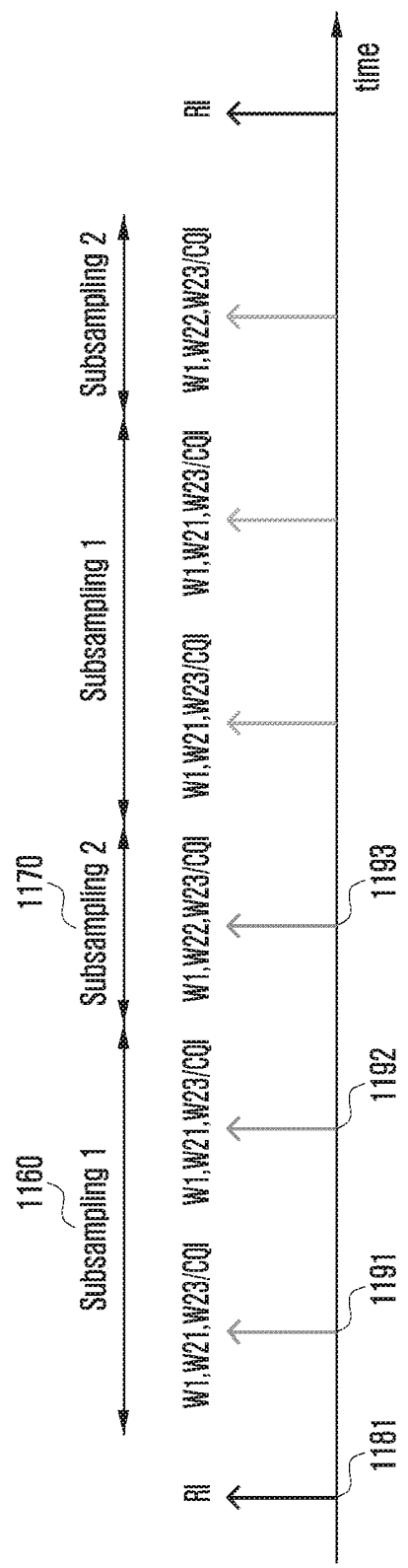

FIGS. 11A and 11B are diagrams showing a method for reporting a channel state of a terminal according to a third embodiment of the present disclosure.

FIG. 11A is a diagram for the terminal to report the channel state information in the submode 1.

Referring to FIG. 11A, the terminal may report RI and first PMI (W1) 1131 at a first reporting time. As described above, in the present embodiment, the terminal may report the first PMI of the first dimension and the first PMI (PMI1H and PMI1V) of the second dimension together.

Thereafter, at the reporting time, the terminal may alternately report the second PMI of the horizontal dimension and the vertical dimension, and the terminal may perform the reporting using different subsampling.

Referring to FIG. 11A, the terminal may transmit a second PMI and CQI 1141 and 1142 of a first dimension using subsampling 1 1110. In addition, the terminal may transmit a second PMI and CQI 1151 of a second dimension using subsampling 2 1120.

The terminal may use PMI of another dimension not reported at the time of each subsampling as the latest reported PMI, the predefined PMI, or the PMI set by RRC, and the detailed contents thereof are the same as described above.

The method using the submode 1 has an advantage in that subsampling other than dimension separation may not be present in the second PMI (W2) or may be minimized. However, according to the method, RI coverage may be reduced and the first PMI (W1) reporting period may be long.

FIG. 11B is a diagram for the terminal to report the channel state information in the submode 2.

Referring to FIG. 11B, the terminal may report only RI 1181 at the first reporting time.

Thereafter, the terminal may alternately report the second PMI of the horizontal dimension and the vertical dimension at the time of the reporting time. At this time, the terminal may separately report only the second PMI (W2) every reporting time, and report the first PMI (W1) along with each separated second PMI (W2). At this time, the terminal may report the second PMI of the horizontal resource and the second PMI of the vertical dimension using different subsampling.

Referring to FIG. 11B, the terminal may transmit a second PMI and CQI 1191 and 1192 of a first dimension using subsampling 1 1160. In addition, the terminal may transmit a second PMI 1193 of a second dimension using subsampling 2 1170.

In addition, the terminal may use PMI of another dimension not reported at the time of each subsampling as the latest reported PMI, the predefined PMI, or the PMI set by RRC, and the detailed contents thereof are the same as described above.

The method using the submode 2 has an advantage in that the RI coverage may be increased and the first PMI (W1) reporting period may be shortened. However, according to the method, the first PMI (W1) and the second PMI (W2) may be reported together to consider additional subsampling other than subsampling for dimension separation, such that the performance may be degraded.

Figure 12A:
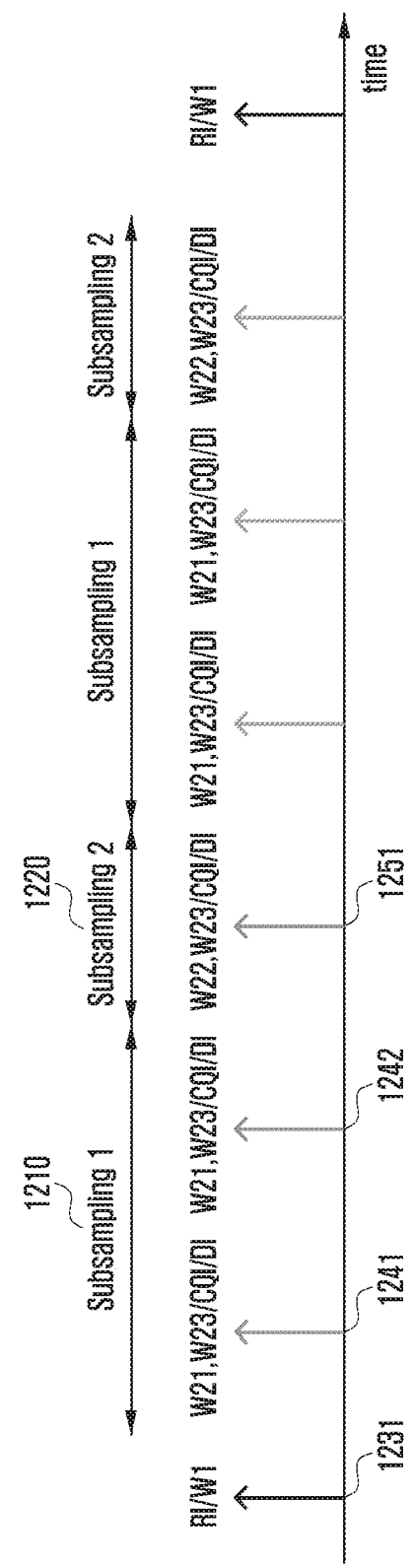
FIGS. 12A and 12B are diagrams showing another method for reporting a channel state of a terminal according to a third embodiment of the present disclosure.
Figure 12B:
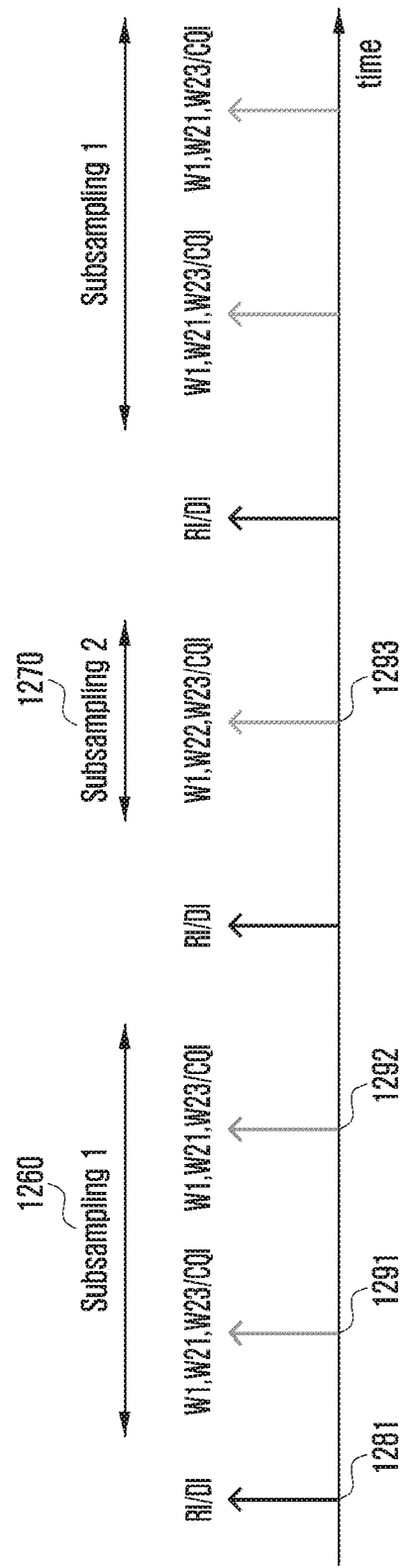

FIGS. 12A and 12B are diagrams showing another method for reporting a channel state of a terminal according to a third embodiment of the present disclosure.

Specifically, FIG. 12 shows a method for reporting channel state information when the dimension indicator (DI) is applied in the PUCCH mode 1-1.

FIG. 12A shows a method for reporting, by a terminal, channel state information in the submode 1, and FIG. 12B shows a method for reporting channel state information in the submode 2.

The reporting time of the dimension indicator (DI) may be reported along with the RI (FIG. 12B) and reported along with PMIs (FIG. 12A).

Referring to FIG. 12A, the terminal may report RI and first PMI (W1) 1231 at a first reporting time. As described above, in the present embodiment, the terminal may report the first PMI of the first dimension and the first PMI (PMI1H and PMI1V) of the second dimension together.

Thereafter, the terminal may alternately report the second PMI of the horizontal dimension and the vertical dimension at the reporting time, and the terminal may report the second PMI and DI of the horizontal dimension and the vertical dimension together. At this time, the terminal may perform the reporting using different subsampling.

Referring to FIG. 12A, the terminal may transmit a second PMI and CQI of a first dimension and DI 1241 and 1242 using subsampling 1 1210. In addition, the terminal may transmit DI 1251 along with a second PMI and CQI of a second dimension using subsampling 2 1220.

The terminal may use PMI of another dimension not reported at the time of each subsampling as the latest reported PMI, the predefined PMI, or the PMI set by RRC, and the detailed contents thereof are the same as described above.

When the DI is reported along with the PMI, there is an advantage in that the reporting dimension may be changed every reporting time, but the codebook subsampling may be added to the PMI.

Meanwhile, referring to FIG. 12B, the terminal may report RI and D1 1281 together at the first reporting time.

Thereafter, the terminal may alternately report the second PMI of the horizontal dimension and the vertical dimension at the reporting time. At this time, the terminal may report the first PMI along with the second PMI separated every reporting time.

Referring to FIG. 12B, the terminal may transmit a second PMI and CQI 1281 and 1292 of a first dimension using subsampling 1 1260. In addition, the terminal may transmit a second PMI and CQI 1293 of a second dimension using subsampling 2 1260.

The detailed operation thereof is similar to one described in FIG. 11B and therefore the description thereof will be omitted.

As such, when the DI is reported along with the RI, since the dimension may be changed every RI reporting time, the reporting dimension may be slowly changed and the RI coverage may be reduced. However, the PMI does not require additional codebook subsampling.

As described above, the PUCCH mode 2-1 is an operation for subband reporting. The terminal may report subband or wideband information according to a precoding type indicator (PTI), and the detailed contents of applying the operation to the channel state reporting using the 2D codebook to which the first PMI (PMI1H) of the first dimension and the first PMI (PMI1V) of the second dimension are reported together will be described below.

Figure 13A:
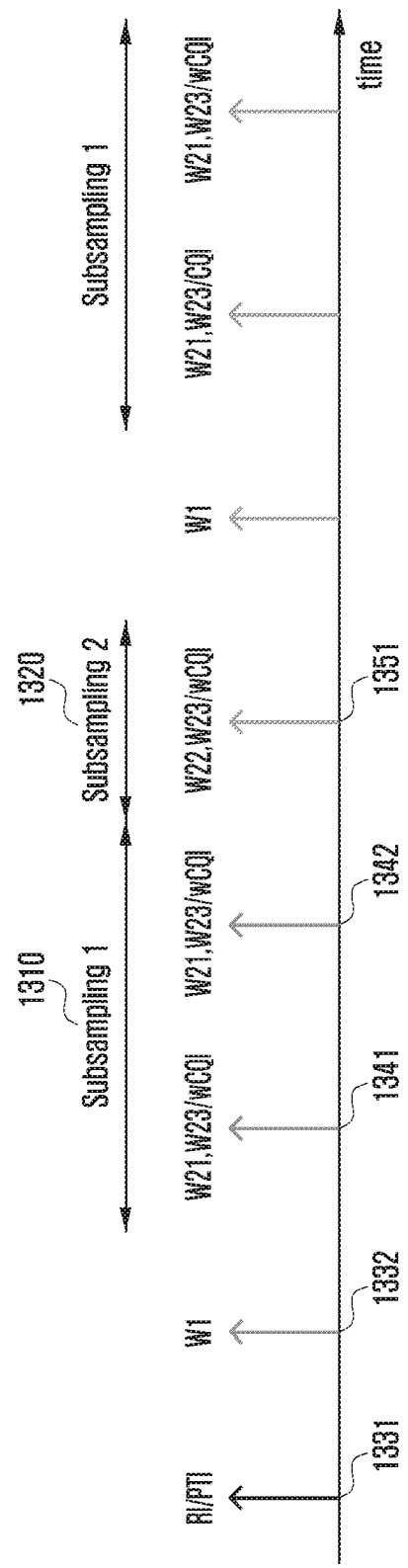
FIGS. 13A and 13B are diagrams showing another method for reporting a channel state of a terminal according to a third embodiment of the present disclosure.
Figure 13B:
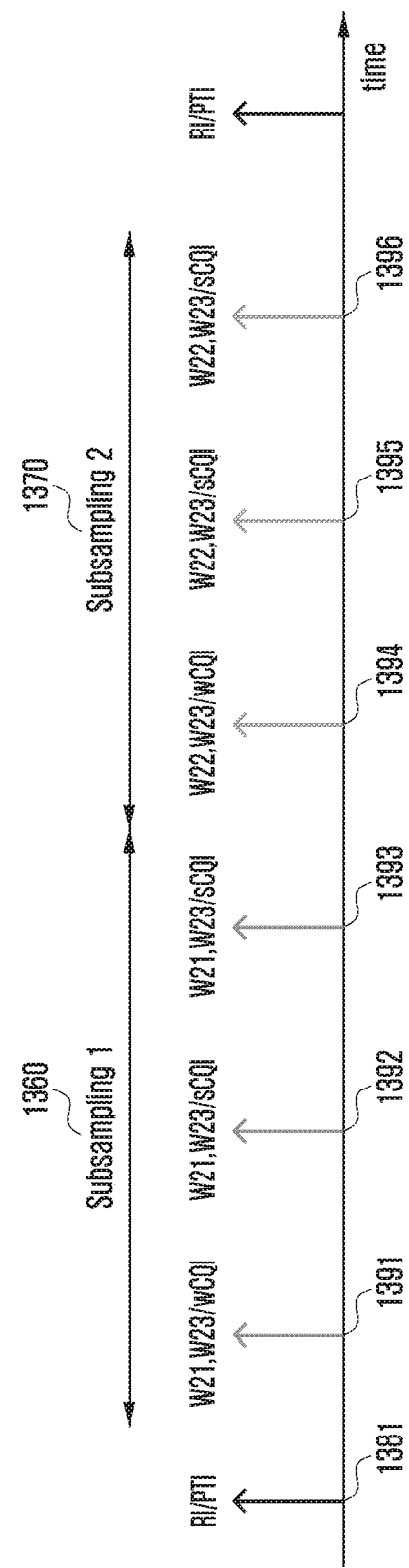

FIGS. 13A and 13B are diagrams showing another method for reporting a channel state of a terminal according to a third embodiment of the present disclosure.

FIG. 13 is a diagram showing that the terminal is operated differently according to the PTI in the PUCCH mode 2-1.

FIG. 13A is a diagram showing a method for reporting, by a terminal, channel state information of a wideband when PTI=0.

Referring to FIG. 13A, the terminal may report RI and PTI 1331. Thereafter, the terminal may report first PMI 1332.

The terminal may report PMIs of a plurality of dimensions at a time to report the first PMI (W1) and report the second PMI by dividing the second PMI into two dimensions at the second PMI (W2) reporting time. At this time, the terminal may alternately report a plurality of subsampling sequentially or according to the determination of the terminal.

Referring to FIG. 13A, the terminal may transmit a second PMI and CQI 1341 and 1342 of a first dimension using subsampling 1 1310. In addition, the terminal may transmit DI 1351 along with a second PMI and CQI of a second dimension using subsampling 2 1320.

In the case of the reporting type, the increase in the PMIs for the second PMI (W21) of the first dimension and the second PMI (W22) of the second dimension may not be larger than the existing PMI (W2), such that since a necessity for additional codebook subsampling may be reduced but in the case of the first PMI (W1), a necessity for additional codebook subsampling may be more increased than before, the additional codebook subsampling may be required.

FIG. 13B is a diagram showing a method for reporting, by a terminal, channel state information of a subband when PTI=1.

Referring to FIG. 13B, the terminal may report RI and PTI 1381. When the PTI=1, the terminal may not report the first PMI. In addition, the terminal may report the second PMI (W2) by dividing the second PMI (W2) into two dimensions. At this time, the terminal may alternately report a plurality of subsampling sequentially or according to the determination of the terminal. In addition, the terminal may transmit the wideband CQI along with the PMI assumption at the first reporting time of each subsampling and transmit the PMI assumption and the subband CQI at the next reporting time.

The terminal may transmit a second PMI and CQI 1391, 1392, and 1393 of a first dimension using subsampling 1 1360. In this case, the CQI may include the CQI 1391 in the wideband and the CQI 1392 and 1393 in the subband.

In addition, the terminal may transmit a second PMI and CQI 1394, 1395, and 1396 of a second dimension using subsampling 2 1370. In this case, the CQI may include the CQI 1391 in the wideband and the CQI 1395 and 1396 in the subband.

Figure 14A:
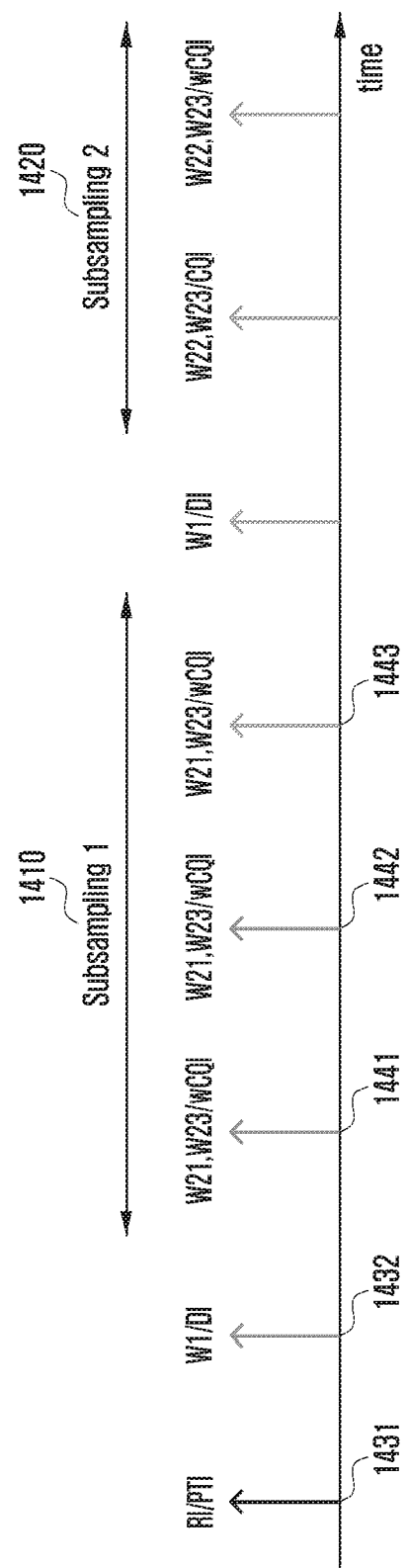
FIGS. 14A and 14B are diagrams showing another method for reporting a channel state of a terminal according to a third embodiment of the present disclosure.
Figure 14B:
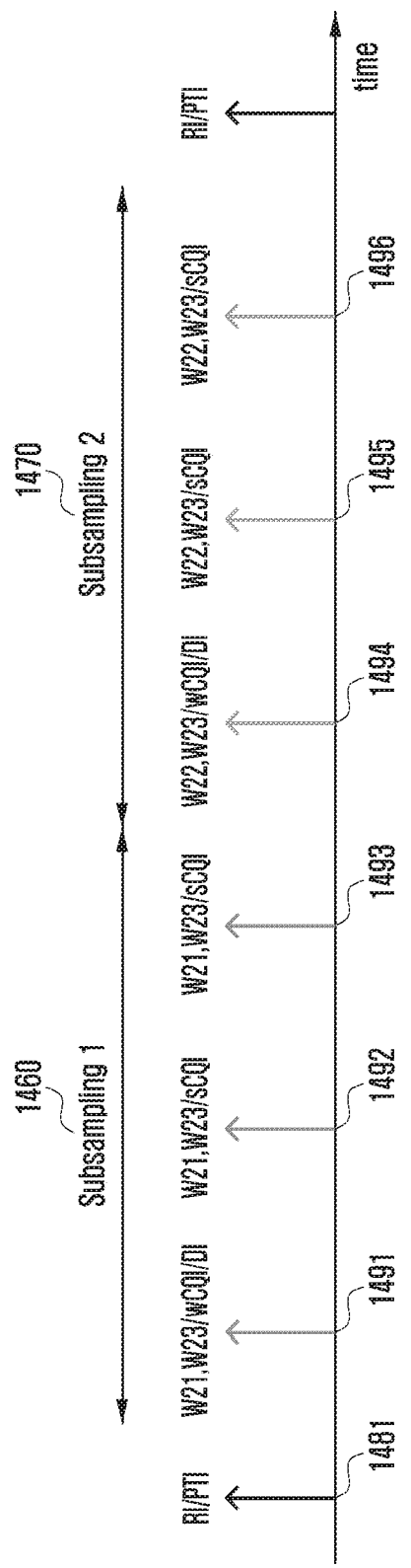

FIGS. 14A and 14B are diagrams showing another method for reporting a channel state of a terminal according to a third embodiment of the present disclosure.

Specifically, FIG. 14 is a diagram showing a method of reporting, by a terminal, channel state information by changing a dimension by applying different codebook subsampling according to a dimension indicator (DI) in the PUCCH mode 2-1.

FIG. 14A is a diagram showing a method for reporting, by a terminal, channel state information of a wideband when PTI=0.

Referring to FIG. 14A, the terminal may report RI and PTI 1431. Thereafter, the terminal may report first PMI and DI 1432.

Thereafter, the terminal may report PMIs of a plurality of dimensions at a time to report the first PMI and report the second PMI by dividing the second PMI into two dimensions at the second PMI reporting time.

At this time, when the terminal reports the first PMI, it may report the dimension indicator (DI) together.

In addition, the terminal may alternately report a plurality of subsampling sequentially or according to the determination of the terminal.

Referring to FIG. 14A, the terminal may transmit a second PMI and CQI 1441, 1442, and 1443 of a first dimension using subsampling 1 1410.

In this figure, the terminal does not need to report the dimension indicator (DI) in advance because it reports PMIs of a plurality of dimensions together in case of the first PMI. Therefore, when the dimension indicator DI is reported along with the first PMI (W1), it can be confirmed that the corresponding second PMI (W2) for the second PMI (W2) to be reported later is the second PMI (W2) of any dimension.

In addition, since only the first PMI (W1) is reported without any other information at the reporting time of the first PMI (W1) when PTI=0, there is a possibility that an additional bit will be included relatively.

FIG. 14B is a diagram showing a method for reporting, by a terminal, channel state information of a subband when PTI=1.

Referring to FIG. 14B, the terminal may report RI and PTI 1481. When the PTI=1, the terminal may not report the first PMI. In addition, the terminal may report the second PMI (W2) by dividing the second PMI (W2) into two dimensions. At this time, the terminal may alternately report a plurality of subsampling sequentially or according to the determination of the terminal.

In addition, the terminal may transmit the wideband CQI and the dimension indicator along with the PMI assumption at the first reporting time of each subsampling and transmit the PMI assumption and the subband CQI at the next reporting time.

The terminal may transmit a second PMI and CQI 1491, 1492, and 1493 of a first dimension using subsampling 1 1460. In this case, the CQI may include the CQI 1391 in the wideband and the CQI 1492 and 1493 in the subband.

In addition, the terminal may transmit a second PMI and CQI 1494, 1495, and 1496 of a second dimension using subsampling 2 1470. In this case, the CQI may include the CQI 1494 in the wideband and the CQI 1495 and 1496 in the subband.

Specifically, the terminal may report the dimension indicator (DI) at the time of the wideband CQI information reporting to bring the reporting location equally when PTI=1 like when PTI=0. In the case of the subband reporting location, to report the subband selection information in advance, the codebook subsampling is applied when RI>1, and therefore there is not much room left.

Meanwhile, the fourth embodiment is a method for using separation reporting by dimension of PMI reporting when the separation reporting of the first PMI (PMI1V) of the first dimension and the first PMI (PMI1V) of the second dimension are used. In the present embodiment, the terminal may report the first PMI (PMI1H) of the first dimension and the first PMI (PMI1V) of the second dimension by separating the first PMI (PMI1H) and the first PMI (PMI1V) using the codebook subsampling, and may report the second PMI (PMI2) by separating the second PMI (PMI2) by dimension.

As described above, the PUCCH mode 1-1 is an operation for wideband reporting. In the submode 1, the terminal may report the RI and the W1 together and may subsample the first PMI (W1) for this purpose. In addition, in the submode 2, the terminal may report the W1, the W2, and the CQI together and may subsample both of the first PMI (W1) and the second PMI (W2) for this purpose. This operation will be described below with reference to FIG. 15 when being applied to the channel state reporting using the 2D codebook to which the first PMI (PMI1H) of the first dimension and the PMI (PMI1V) of the second dimension are separated and reported.

Figure 15A:
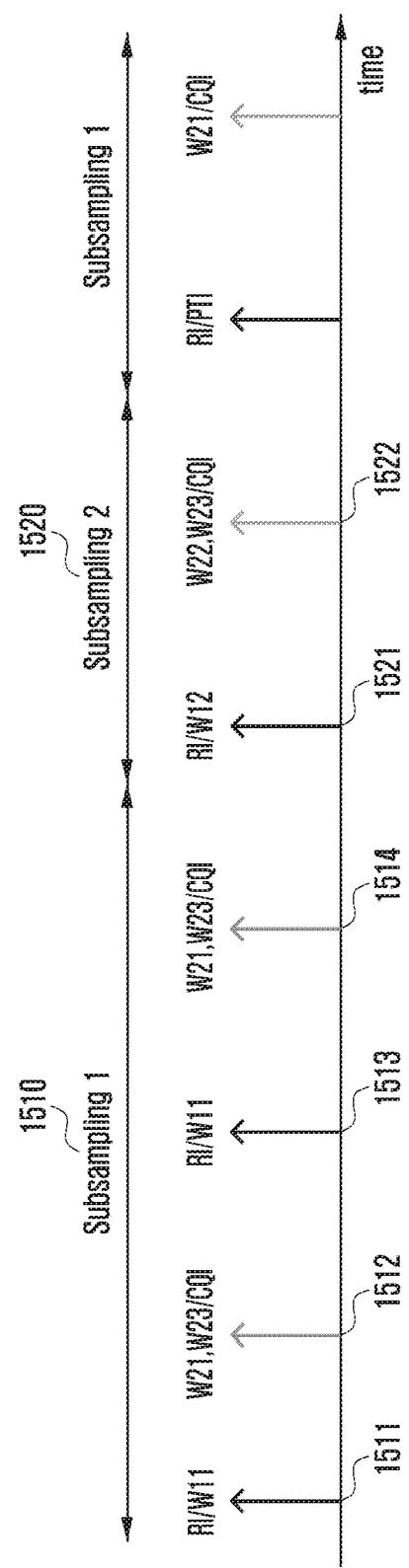
FIGS. 15A and 15B are diagrams showing a method for reporting a channel state of a terminal according to a fourth embodiment of the present disclosure.
Figure 15B:
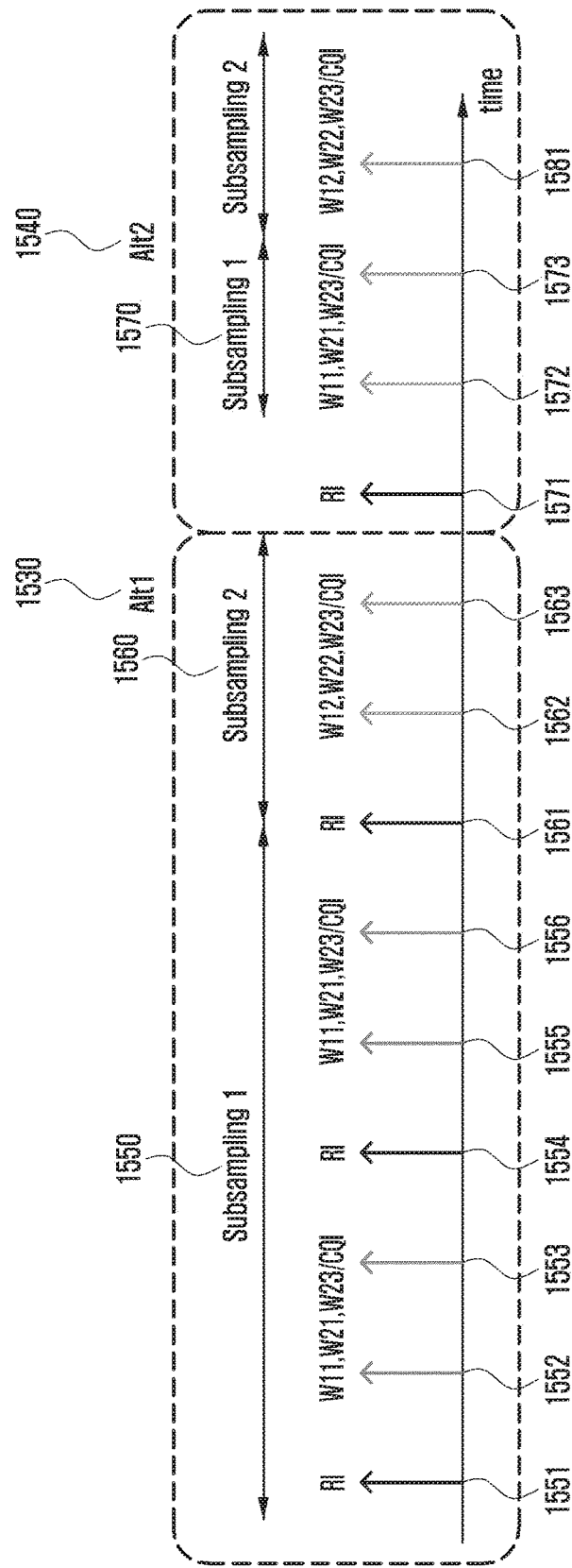

FIGS. 15A and 15B are diagrams showing a method for reporting a channel state of a terminal according to a fourth embodiment of the present disclosure.

FIG. 15A is a diagram showing a method for reporting, by a terminal, channel state information in submode 1.

Referring to FIG. 15A, the terminal may report the first PMI (W1) together. At this time, the codebook subsampling may also be applied to the first PMI (W1) to separate and report the dimension. That is, in the present embodiment, the terminal may report the first PMI of the first dimension and the first PMI (PMI1H and PMI1V) of the second dimension separately. Therefore, unlike the third embodiment, the dimension may be changed even at the first PMI (W1) reporting time.

That is, the terminal may transmit the RI and the first PMIs 1511 and 1513 of the first dimension. At this time, when the subsampling for the RI is supported (or when the RI may be transmitted by dimension), the terminal may transmit the RI using subsampling #1. In addition, the terminal may transmit a second PMI and CQI 1512 and 1514 of a first dimension using subsampling 1 1510.

The terminal may report the RI and the first PMI 1521 of the second dimension and may transmit a second PMI and CQI 1522 of the second dimension using the subsampling 2 1520.

FIG. 15B is a diagram illustrating a method for reporting, by a terminal, channel state information in submode 2.

In FIG. 15B, since the first PMI (W1) and the second PMI (W2) are reported together, the application of the corresponding subsampling may be made by two methods.

The first method is a method for performing a change every RI reporting period, and the terminal may maintain the same subsampling dimension during a certain RI reporting period, and then change the subsampling dimension in the RI reporting period thereafter. The detailed contents are the same as the method shown in Alt1 in FIG. 15.

The second method is to change the subsampling in the RI reporting period, and the terminal may periodically report the second PMI (W2) in the RI reporting period, which is reporting on the assumption of the wideband. Therefore, another subsampling may be reported to the corresponding reporting. The detailed contents are the same as the method shown in Alt2 in FIG. 15. This method has a faster reporting period than that of the first method (Alt1), and therefore may transmit the information of the horizontal dimension and the vertical dimension more rapidly.

Referring to FIG. 15B, the terminal may transmit RI 1551 in the first method 1530, and may transmit the first PMI of the first dimension and the second PMI and CQI 1552 and 1553 of the first dimension by using the subsampling 1 1550. In addition, the terminal may transmit RI 1561 after the predefined RI reporting period and transmit a first PMI of a second dimension and second PMI and CQI 1562 and 1563 of a second dimension by using subsampling 2 1560. At this time, when the subsampling for the RI is supported (or when the RI may be transmitted by dimension), the terminal may transmit the RI 1551 and 1561 by using each of the subsampling 1 and subsampling 2.

Figure 16A:
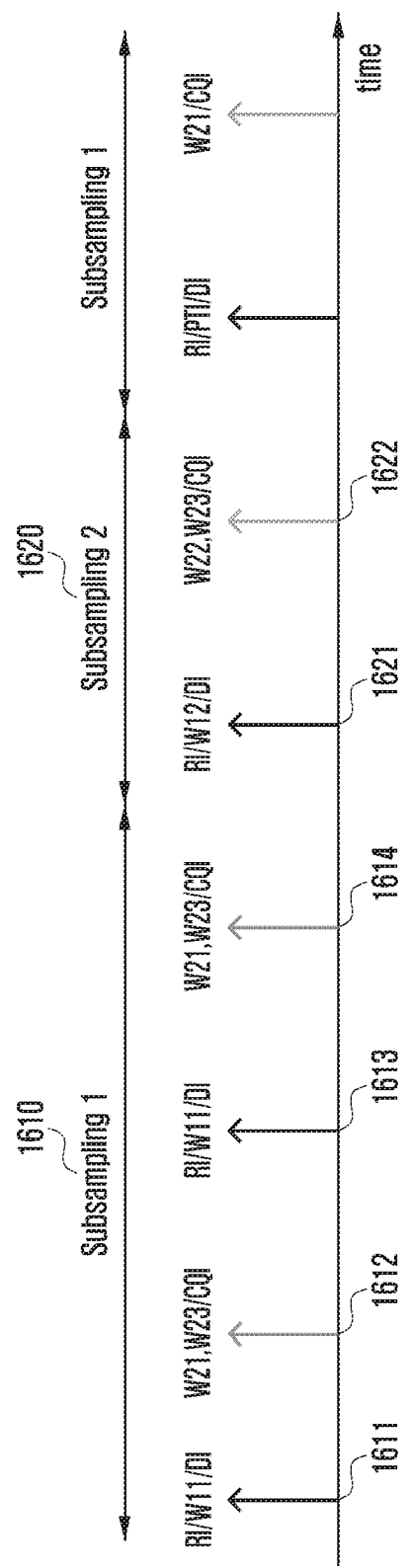
FIGS. 16A and 16B are diagrams showing another method for reporting a channel state of a terminal according to a fourth embodiment of the present disclosure.
Figure 16B:
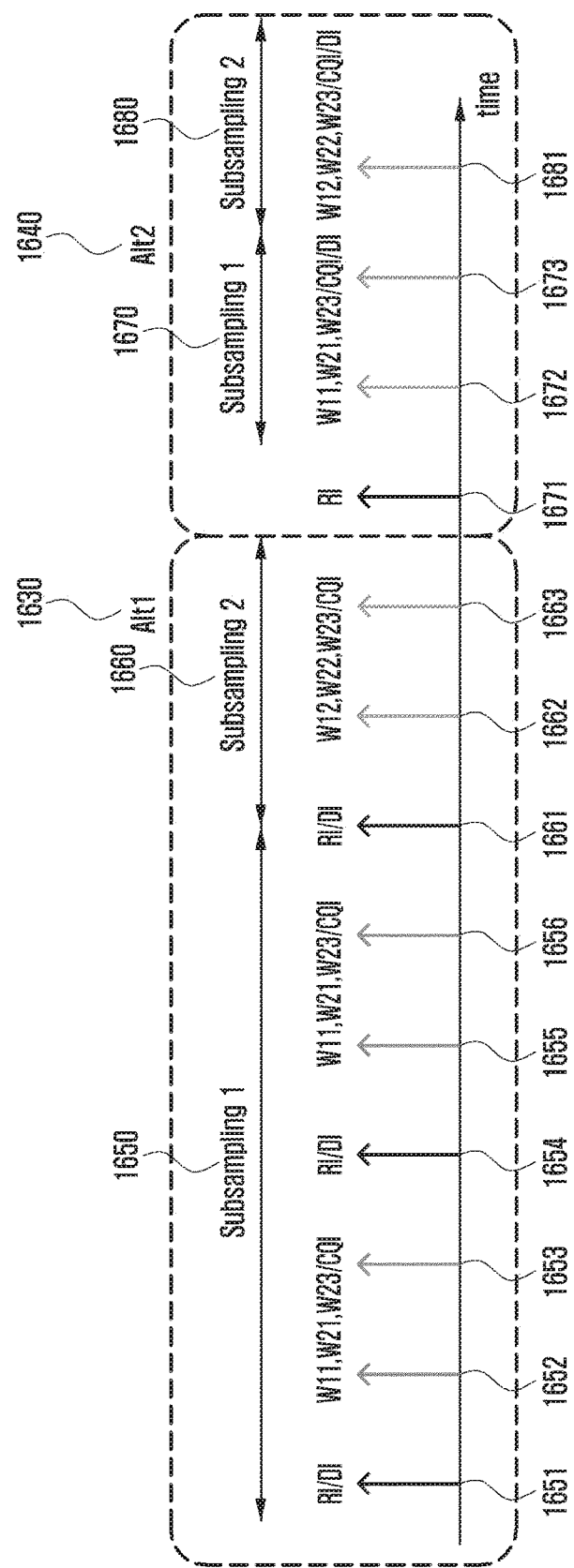

The terminal may transmit RI 1571 in the second method 1540, and may transmit the first PMI of the first dimension and the second PMI and CQI 1551, 1572, and 1573 of the first dimension by using the subsampling 1 1572. In addition, the terminal may transmit a first PMI of a second dimension and second PMI and CQI 1581 of a second dimension by using subsampling 2 1580 within the same RI reporting period. FIGS. 16A and 16B are diagrams showing another method for reporting a channel state of a terminal according to a fourth embodiment of the present disclosure.

Specifically, FIG. 16 shows a method of applying subsampling differently in the PUCCH mode 1-1 when using the separation reporting of the first PMI (PMI1H) of the first dimension and the first PMI (PMI1V) of the second dimension.

FIG. 16A is a diagram showing a method for reporting, by a terminal, channel state information in submode 1.

Referring to FIG. 16A, the terminal may report the first PMI (W1) together. At this time, the codebook subsampling may also be applied to the first PMI (W1) to separate and report the dimension. Therefore, unlike the third embodiment, the dimension may be changed even at the first PMI (W1) reporting time.

In addition, in the present embodiment, the dimension indicator DI is added at the RI and the first PMI (W1) reporting time, and thus the terminal itself may select and report the dimension.

That is, the terminal may transmit RI and first PMI and DI 1611 and 1613 of the first dimension. At this time, when the subsampling for the RI is supported (or when the RI may be transmitted by dimension), the terminal may transmit the RI using subsampling #1. In addition, the terminal may transmit a second PMI and CQI 1612 and 1614 of a first dimension using subsampling 1 1610.

In addition, the terminal may transmit R1 and first PMI and DI 1621 of a second dimension using subsampling 2 1620. In addition, the terminal may transmit a second PMI and CQI 1622 of a second dimension using subsampling 2 1620.

FIG. 16B is a diagram illustrating a method for reporting, by a terminal, channel state information in submode 2.

In FIG. 16B, since the first PMI (W1) and the second PMI (W2) are reported together, the application of the corresponding subsampling may be made by two methods.

The first method is a method for performing a change every RI reporting period, and the terminal may maintain the same subsampling dimension during a certain RI reporting period, and then change the subsampling dimension in the RI reporting period thereafter. The detailed contents relates to subsampling of Alt 1 in FIG. 16.

In this case, the terminal needs to report the DI along with the RI, such that the base station may confirm to the information of which dimension the channel state reporting in the corresponding RI reporting period belongs.

The second method is to change the subsampling in the RI reporting period, and the terminal may report the second PMI (W2) in the RI reporting period, which is reporting on the assumption of the wideband. Therefore, another subsampling may be reported to the corresponding reporting. The detailed contents are the same as the method shown in Alt2 in FIG. 16. This method has a faster reporting period than that of the first method (Alt1), and therefore may transmit the information of the horizontal dimension and the vertical dimension more rapidly.

In this case, the terminal may transmit the DI along with the first PMI (W1), the second PMI (W2), and the CQI. Referring to FIG. 16B, the terminal may transmit a dimension indicator 1651 along with the RI in a first method 1630. At this time, when the subsampling for the RI is supported (or when the RI may be transmitted by dimension), the terminal may transmit the RI using the subsampling #1. As such, the terminal can inform the base station of the dimension within the current RI reporting period by transmitting the dimension indicator along with the RI. In addition, the terminal may transmit a first PMI of a first dimension and a second PMI and CQI 1652 and 1653 of a first dimension using subsampling 1 1650.

In addition, the terminal may transmit a dimension indicator 1661 along with the RI after the predefined RI reporting period. As such, the terminal may inform the base station of the dimension within the corresponding RI reporting period by transmitting the dimension indicator along with the RI. In addition, the terminal may transmit a first PMI of a second dimension and second PMI and CQI 1662 and 1663 of a second dimension using subsampling 2 1660.

The terminal may transmit RI 1671 in the second method 1640, and may transmit dimension indicators 1651, 1672, and 1673 along with the first PMI of the first dimension and the second PMI and CQI of the first dimension by using the subsampling 1 1670. The terminal may transmit the dimension of the currently transmitted channel state information to the base station by transmitting the dimension indicator along with the first PMI of the first dimension and the second PMI and CQI of the first dimension.

Figure 17A:
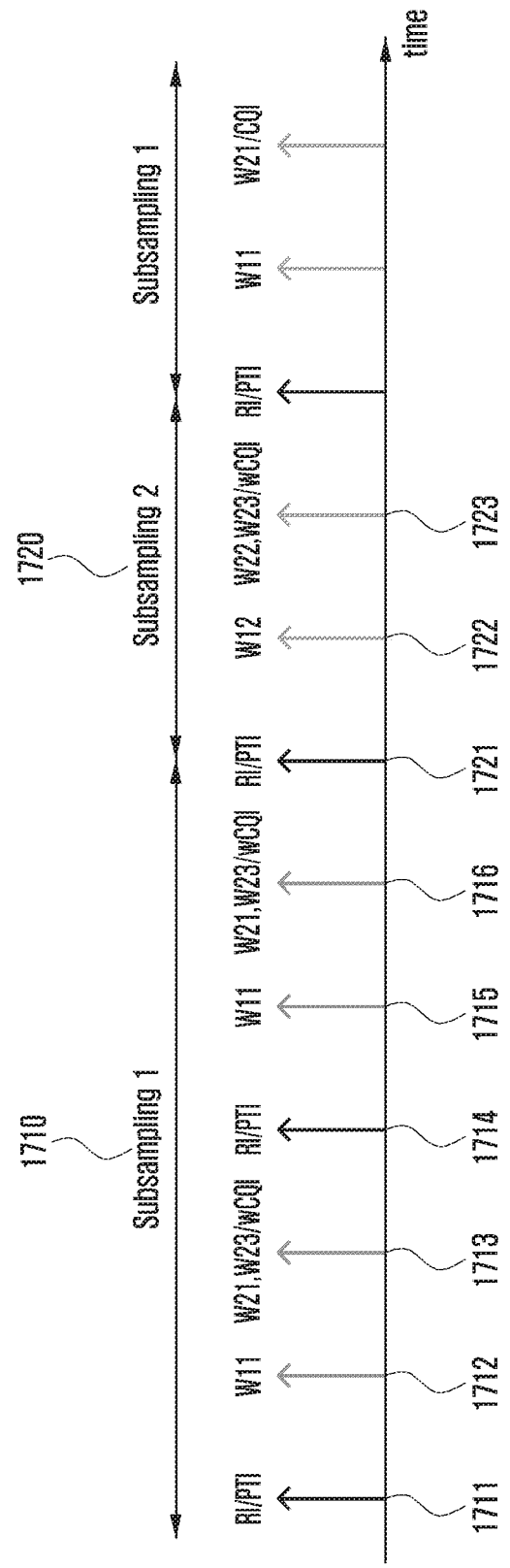
FIGS. 17A and 17B are diagrams showing another method for reporting a channel state of a terminal according to a fourth embodiment of the present disclosure.
Figure 17B:
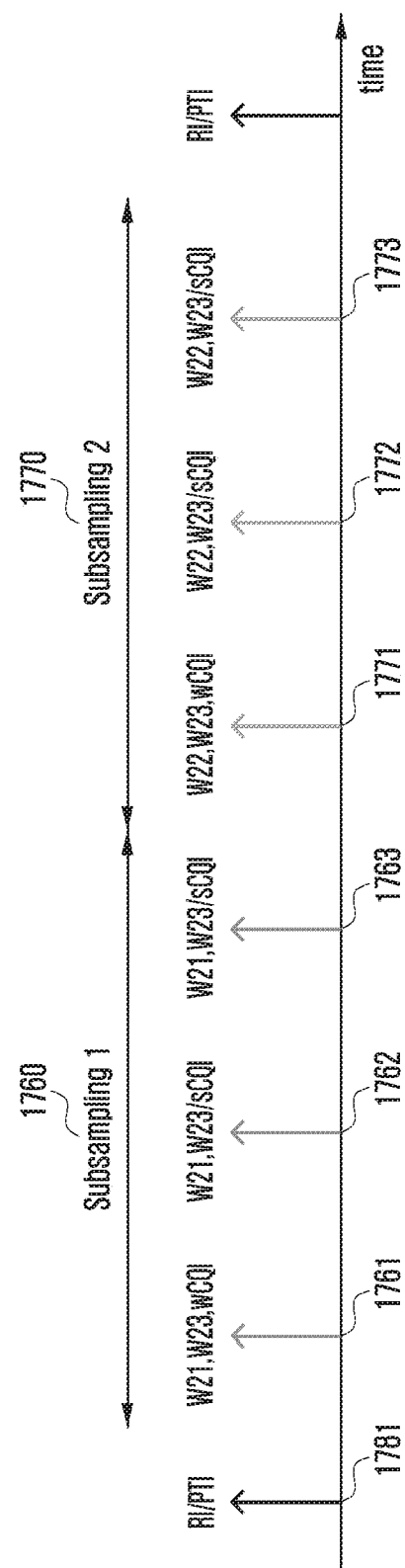

In addition, the terminal may transmit a first PMI of a second dimension and second PMI and CQI 1681 of a second dimension by using subsampling 2 1680 within the same RI reporting period. Similarly, the terminal may transmit the dimension of the currently transmitted channel state information to the base station by transmitting the dimension indicator. FIGS. 17A and 17B are diagrams showing another method for reporting a channel state of a terminal according to a fourth embodiment of the present disclosure.

FIG. 17 is a diagram showing a method of reporting, by a terminal, channel state information by changing a dimension by applying different codebook subsampling in the PUCCH mode 2-1.

In addition, FIG. 17 is a diagram showing that the terminal is operated differently according to the PTI in the PUCCH mode 2-1.

FIG. 17A shows a method for reporting, by a terminal, channel state information of a wideband when PTI=0.

The terminal may report the PMI by dividing the PMI int the first PMI (W11) of the first dimension or the first PMI (W12) of the second dimension by applying the codebook subsampling to separate the dimension of the first PMI (W1). In addition, the second PMI may be reported by being divided into two dimensions at the second PMI (W2) reporting. At this time, the terminal may alternately report a plurality of subsampling sequentially or according to the determination of the terminal.

Referring to FIG. 17A, the terminal may transmit RI and PTI 1711 and 1714. In addition, the terminal may transmit a first PMI 1712 and 1715 of a first dimension and a second PMI and CQI 1713 and 1716 of a second dimension using subsampling 1 1710.

In addition, the terminal may transmit RI and PTI 1721. In addition, the terminal may transmit a first PMI 1722 of a first dimension and a second PMI and CQI 1723 of a second dimension using subsampling 2 1720.

At this time, when the subsampling for the RI is supported (or when the RI may be transmitted by dimension), the terminal may transmit the RI by using each of the subsampling 1 and subsampling 2.

In the case of this reporting type, the increase in the PMIs for the first PMI (W11) of the first dimension, the first PMI (W12) of the second dimension, the second PMI (W21) of the first dimension, and the second PMI (W23) of the second dimension may not be larger than the existing first PMI (W1) and second PMI (W2), which can lead to reduce the necessity of the additional codebook subsampling but more increase the beam group change period by applying the codebook subsampling by dimension than before the related art even in the case of the second PMI (W2).

FIG. 17B is a diagram showing a method for reporting, by a terminal, channel state information of a subband when PTI=1.

Referring to FIG. 17B, the terminal may report RI and PTI 1781. When the PTI=1, the terminal may not report the first PMI. In addition, the terminal may report the second PMI (W2) by dividing the second PMI (W2) into two dimensions. At this time, the terminal may alternately report a plurality of subsampling sequentially or according to the determination of the terminal. In addition, the terminal may transmit the wideband CQI along with the PMI assumption at the first reporting time of each subsampling and transmit the PMI assumption and the subband CQI at the next reporting time.

The terminal may transmit a second PMI and CQI 1761, 1762, and 1763 of a first dimension using subsampling 1 1760. In this case, the CQI may include the CQI 1761 in the wideband and the CQI 1762 and 1763 in the subband.

In addition, the terminal may transmit a second PMI and CQI 1771, 1772, and 1773 of a second dimension using subsampling 2 1770. In this case, the CQI may include the CQI 1771 in the wideband and the CQI 1772 and 1773 in the subband.

Figure 18A:
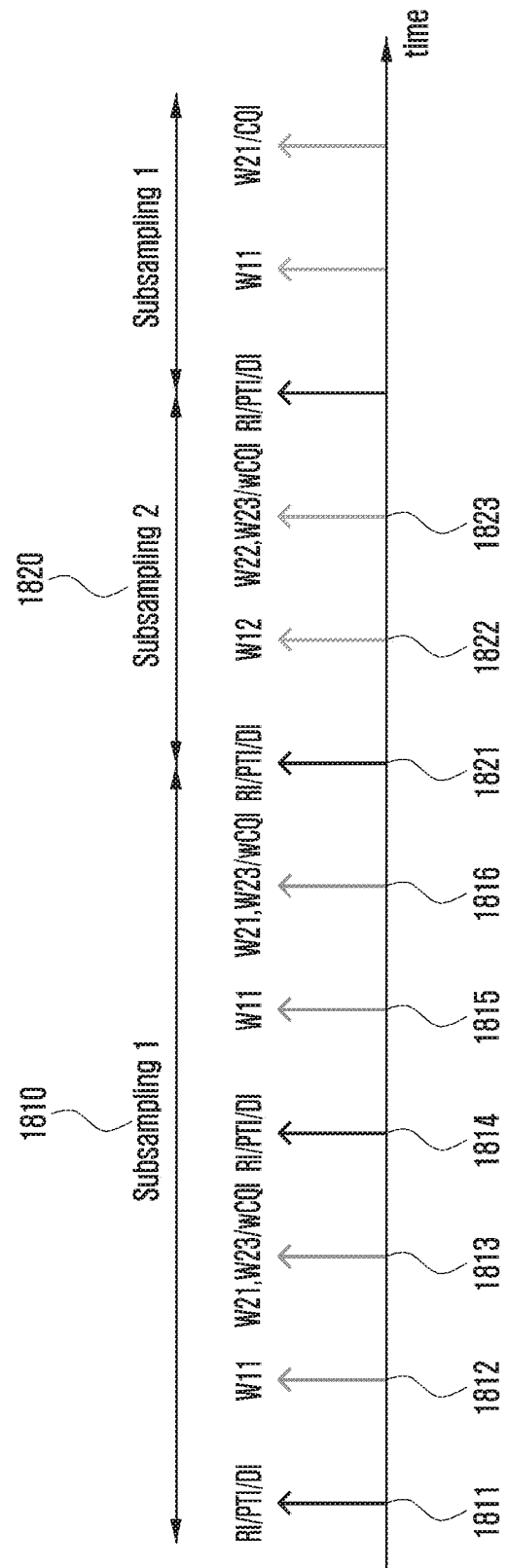
FIGS. 18A and 18B are diagrams showing another method for reporting a channel state of a terminal according to a fourth embodiment of the present disclosure.
Figure 18B:
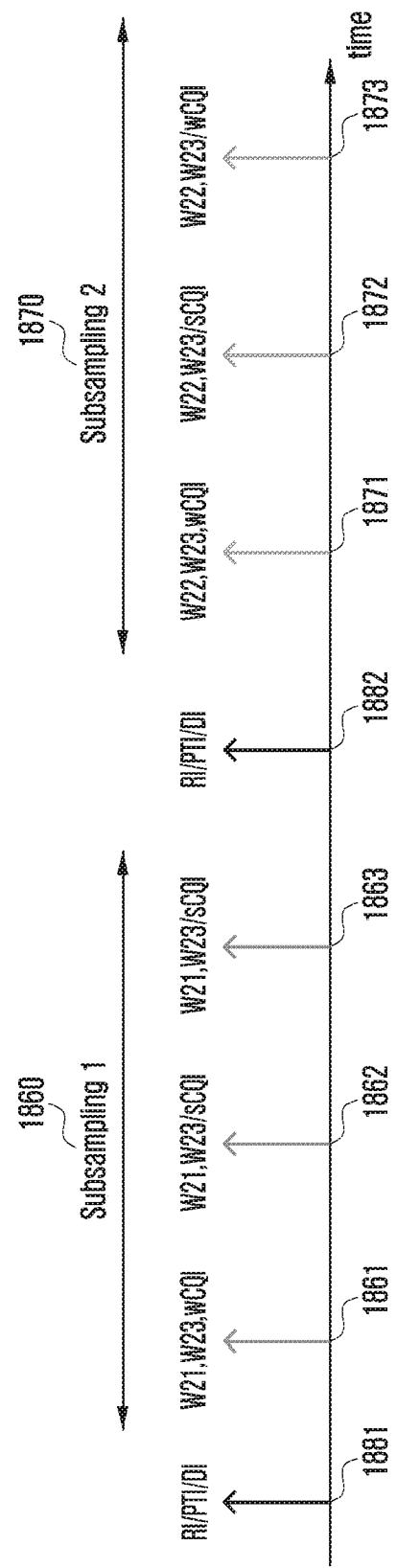

FIGS. 18A and 18B are diagrams showing another method for reporting a channel state of a terminal according to a fourth embodiment of the present disclosure.

Specifically, FIG. 18 is a diagram showing a method of reporting, by a terminal, channel state information by changing a dimension by applying different codebook subsampling according to a dimension indicator (DI) in the PUCCH mode 2-1.

FIG. 18A is a diagram showing a method for reporting, by a terminal, channel state information of a wideband when PTI=0.

Referring to FIG. 18A, the terminal may report DI 1811 and 1814 along with RI and PTI. As such, the terminal may inform the base station of the dimension of the channel state information in the current subsampling by reporting the DI along with the RI and the PTI. In addition, the terminal may transmit a first PMI 1812 and 1815 of a first dimension and a second PMI and CQI 1813 and 1816 of a second dimension using subsampling 1 1810.

In addition, the terminal may transmit DI 1821 along with the RI and the PTI. As such, the terminal may inform the base station of the dimension of the channel state information in the current subsampling by reporting the DI along with the RI and the PTI. In addition, the terminal may transmit a first PMI 1822 of a first dimension and a second PMI and CQI 1823 of a second dimension using subsampling 2 1820.

At this time, when the subsampling for the RI is supported (or when the RI may be transmitted by dimension), the terminal may transmit the RI by using each of the subsampling 1 and subsampling 2.

FIG. 18B is a diagram showing a method for reporting, by a terminal, channel state information of a subband when PTI=1.

Referring to FIG. 18B, the terminal may report DI 1881 and 1882 along with RI and PTI. As such, the terminal may inform the base station of the dimension of the channel state information in the current subsampling by reporting the DI along with the RI and the PTI.

When the PTI=1, the terminal may not report the first PMI. In addition, the terminal may report the second PMI (W2) by dividing the second PMI (W2) into two dimensions. At this time, the terminal may alternately report a plurality of subsampling sequentially or according to the determination of the terminal. In addition, the terminal may transmit the wideband CQI along with the PMI assumption at the first reporting time of each subsampling and transmit the PMI assumption and the subband CQI at the next reporting time.

The terminal may transmit a second PMI and CQI 1861, 1862, and 1863 of a first dimension using subsampling 1 1860. In this case, the CQI may include the CQI 1861 in the wideband and the CQI 1862 and 1863 in the subband.

In addition, the terminal may transmit a second PMI and CQI 1871, 1872, and 1873 of a second dimension using subsampling 2 1870. In this case, the CQI may include the CQI 1871 in the wideband and the CQI 1872 and 1873 in the subband.

In FIG. 18, since the terminal separates and reports the first PMI (W1) unlike the third embodiment, I may report the dimension indicator (DI) along with the RI. The reporting method using codebook subsampling is advantageous in supporting a 2D codebooks by separating PMI by dimension without requesting additional codebook subsampling to the PMI but change the dimension b the RI period, such that the dimension change period for the channel state reporting may be delayed, thereby causing the performance degradation. In addition, the RI coverage will be decreased as well. Therefore, in order to supplement this, as mentioned in the PUCCH mode 2-1 according to the third embodiment, the method for indicating which subsampling is applied by using the first PMI (W1) reporting period (PTI=0), the wideband CQI reporting period (PTI=1) or the like may be used.

The reporting method by subsampling described above may be used even for the aperiodic channel state reporting. The current Rel-11 LTE standard does not apply subsampling in the aperiodic channel state reporting. However, in the case of the 2D codebook, the number of codebooks is greatly increased, and the PMI calculation and the reporting overhead of the terminal may be greatly increased accordingly. Accordingly, the reporting may be made by applying subsampling even when the terminal reports the aperiodic channel state reporting, thereby remarkably reducing the calculation and the reporting overhead of the corresponding terminal. There are three methods for informing the terminal of application of subsampling for the aperiodic channel state reporting.

Method 1 for recognizing application of subsampling of terminal: Setting of RRC

Method 2 for recognizing application of subsampling of terminal: Transmission through DCI The first method is set by the RRC and specifies which subsampling that corresponding trigger assumes by adding 1 bit to a field connected to a table of aperiodic CSI trigger. In this case, the terminal may differently apply the codebook subsampling by group by using the same, but may increase the RRC configuration or the DCI overhead to increase the case in which all the codebook subsampling may be alternately applied.

The second method is to inform it through the DCI. By adding 1 bit to the DCI field and transmitting it along with the aperiodic CSI trigger, it specifies whether the corresponding trigger requests the channel state reporting by allowing the corresponding trigger to assume any subsampling. In this case, if 2 bits are used, 0 may not be used, 1 may be used by applying the first codebook subsampling, 2 may be used by applying the second codebook subsampling, and 3 may be used by applying the codebook subsampling to both of the two dimensions, and so on.

Figure 19:
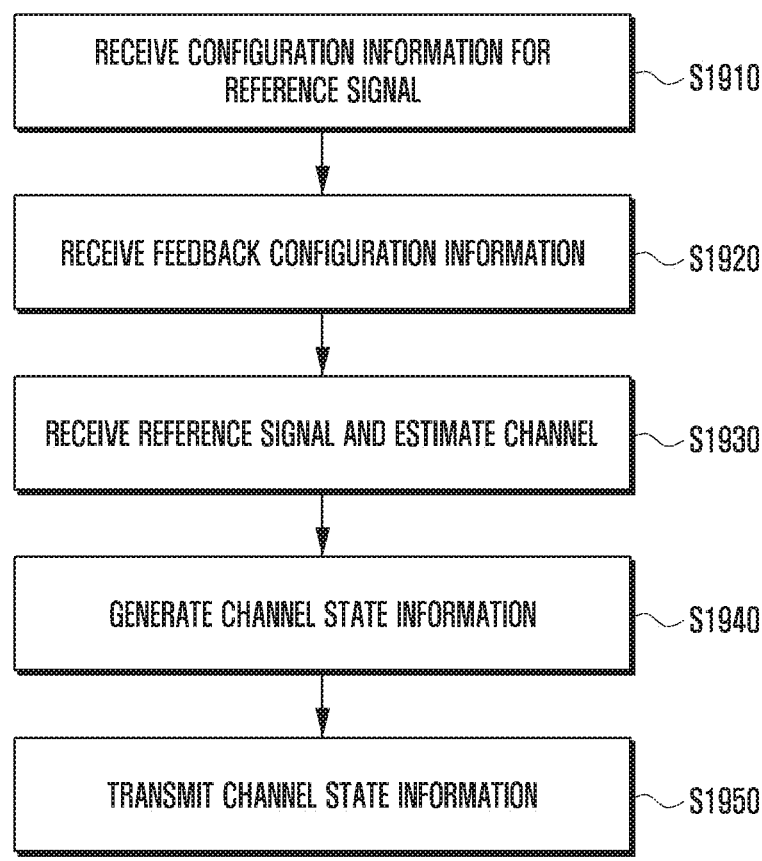
FIG. 19 is a flow chart of an operation order of a terminal according to an embodiment of the present disclosure.

FIG. 19 is a flow chart of an operation order of a terminal according to an embodiment of the present disclosure.

Referring to FIG. 19, in step S1910, the terminal may receive configuration information (hereinafter, referred to as reference signal configuration information) for a reference signal. The terminal may receive configuration information for the CSI-RS.

Therefore, the terminal may be confirm at least one of the number of antenna ports for each CSI-RS, the timing and resource location at which each CSI-RS is transmitted, whether to set the RI-reference CSI-process, the corresponding CSI-process index, and transmit power information, based on the received reference signal configuration information.

Thereafter, the terminal may receive feedback configuration information in step S1920. The feedback configuration information may be determined based on at least one CSI-RS. The terminal may receive the feedback configuration information through RRC signaling. The feedback configuration information may include reference signal configuration information, and in this case, step S1910 may be omitted.

In addition, the feedback configuration information may include any one of a reporting mode, feedback timing information, PMI codebook information, information on the number of first reporting, information on the number of second reporting, reporting offset information, first reporting subsampling configuration information, dimension indictor enable information, and PMI assumption of initial CSI reporting.

In this case, when the dimension indicator enable information is set to use the dimension indicator, the information on the number of first reporting and the information on the number of second reporting are not included in the feedback configuration information, or the terminal may not use the information on the number of first reporting and the information on the number of second reporting.

On the other hand, when the dimension indicator enable information is set to not use the dimension indicator, the terminal may transmit the channel state information to the base station through each subsampling by using the information on the number of first reporting and the information on the number of second reporting.

The detailed contents of the feedback configuration information are the same as described above, and will not be described below.

Thereafter, in step S1930, the terminal may measure the channel by receiving the reference signal. The terminal may receive the CSI-RS and estimate the channel between the base station antenna and the reception antenna of the terminal using the received CSI-RS.

In step S1940, the terminal may generate the channel state information according to the channel measurement result.

Specifically, the terminal may calculate the rank information, the PMI, and the CQI by using the received feedback configuration information and the defined codebook, based on the virtual channel added between the estimated channel and the CSI-RS.

Next, in step 1950, the terminal transmits the channel state information to the base station at the feedback timing determined depending on the feedback configuration of the base station to finish the process of generating and reporting the channel feedback in consideration of the two-dimensional arrangement.

Specifically, the terminal may transmit the channel state information to the base station using at least two subsamplings at the reporting time determined based on the feedback configuration information.

As described above, the channel state information may include the PMI, and the PMI may include a first PMI and a second PMI. In addition, the first PMI may include the PMIs of the first dimension and the second dimension, and the second PMI may include the PMIs of the first dimension and the second dimension.

The first PMI of the first dimension and the first PMI of the second dimension may be transmitted simultaneously or separately. In addition, the second PMI of the first dimension and the second PMI of the second dimension may be transmitted simultaneously or separately. Specifically, the terminal may transmit at least one of the first PMI of the first dimension and the second PMI of the first dimension using the subsampling 1 and at least one of the first PMI of the second dimension and the second PMI of the second dimension using the subsampling 2, at the reporting time.

In addition, when the dimension indicator enable information is included (or configured) in the feedback configuration information, the terminal may determine the dimension indicator depending on the subsampling used to report the channel state information and transmit the determined dimension indicator to the base station.

For example, when the terminal transmits the first PMI of the first dimension and the second PMI of the first dimension using the subsampling 1, the terminal may set the dimension indicator to be 0 and transmit the set dimension indicator to the base station.

In addition, when the terminal transmits the first PMI of the second dimension and the second PMI of the second dimension using the subsampling 2, the terminal may set the dimension indicator to be 1 and transmit the set dimension indicator to the base station.

However, if the dimension indicator enable information is included (or configured) in the feedback configuration information, the terminal may report the channel state information based on the information on the number of reporting included in the feedback configuration information. In addition, the terminal may use the initial reporting subsampling configuration information.

The information on the number of reporting may include the information on the number of first reporting and the information on the number of second reporting, and the information on the number of first reporting may mean the number of reporting using subsampling #1 and the number of second reporting may mean the number of reporting using subsampling #2. In addition, the initial reporting subsampling configuration information may indicate the subsampling used for the initial reporting.

Therefore, the terminal may determine the subsampling to be used according to the initial reporting subsampling configuration information and confirm the number of times to be reported by using each subsampling according to the information on the number of reporting.

For example, if the initial reporting subsampling configuration information indicates the subsampling 1, the information on the number of first reporting is set to be 2, and the information on the number of second reporting is set to be 1, the terminal may perform the reporting twice using the subsampling 1 and perform the reporting once using the subsampling 2.

Meanwhile, a method for reporting, by a terminal, channel state information may be configured variously, which is the same as described above. Therefore, the detailed contents thereof will be omitted.

Figure 20:
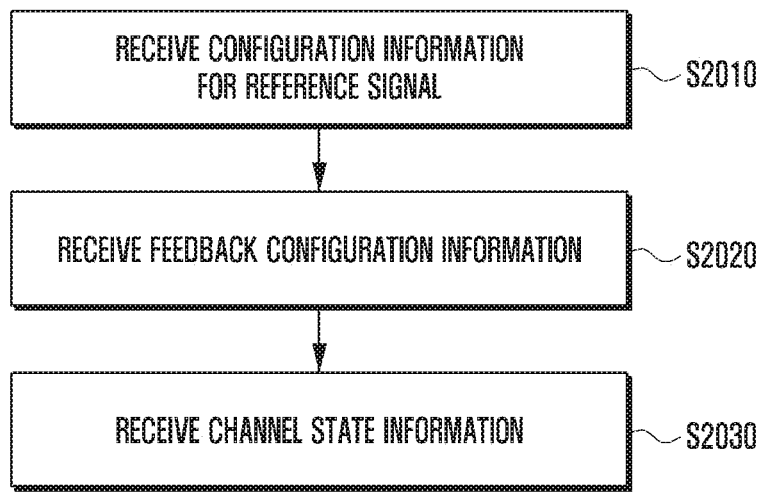
FIG. 20 is a flow chart of an operation order of a base station according to an embodiment of the present disclosure.

FIG. 20 is a flow chart of an operation order of a base station according to an embodiment of the present disclosure.

Referring to FIG. 20, in step S2010, the base station may transmit the reference signal configuration information to the terminal. Specifically, the base station may transmit the configuration information for the CSI-RS for measuring the channel to the terminal.

The reference signal configuration information may include at least one of the number of ports for each CSI-RS, the timing and resource location at which each CSI-RS at which each CSI-RS is transmitted, whether to set the RI-reference CSI-process, the corresponding CSI-process index, and transmit power information.

Thereafter, the base station may transmit the feedback configuration information to the terminal in step S1920. The feedback configuration information may be determined based on at least one CSI-RS. In addition, the base station may transmit the feedback configuration information to the terminal through the RRC signaling. The feedback configuration information may include reference signal configuration information, and in this case, step S2010 may be omitted.

In addition, the feedback configuration information may include any one of a reporting mode, feedback timing information, PMI codebook information, information on the number of first reporting, information on the number of second reporting, reporting offset information, first reporting subsampling configuration information, dimension indictor enable information, and PMI assumption of initial CSI reporting.

In this case, when the dimension indicator enable information is set to use the dimension indicator, the information on the number of first reporting and the information on the number of second reporting are not included in the feedback configuration information, or the terminal may not use the information on the number of first reporting and the information on the number of second reporting.

On the other hand, when the dimension indicator enable information is set to not use the dimension indicator, the base station may receive the channel state information through each subsampling by using the information on the number of first reporting and the information on the number of second reporting.

The detailed contents of the feedback configuration information are the same as described above, and will not be described below.

Thereafter, the base station may transmit the configured reference signal (CSI-RS) to the terminal. The terminal may estimate the channels for each port and estimates an additional channel for the virtual channel based on the estimated channels. The terminal may determine the channel state information and generate the PMI, the RI, and the CQI corresponding thereto and transmit them to the base station.

Accordingly, in step S2030, the base station may receive the channel state information from the terminal at predetermined timing according to the feedback configuration information and may use the channel state information to determine the channel state between the terminal and the base station.

Specifically, the base station may receive the channel state information using at least two subsamplings at the reporting time determined based on the feedback configuration information.

As described above, the channel state information may include the PMI, and the PMI may include a first PMI and a second PMI. In addition, the first PMI may include the PMIs of the first dimension and the second dimension, and the second PMI may include the PMIs of the first dimension and the second dimension.

The first PMI of the first dimension and the first PMI of the second dimension may be transmitted simultaneously or separately. In addition, the second PMI of the first dimension and the second PMI of the second dimension may be transmitted simultaneously or separately. Specifically, the base station may receive at least one of the first PMI of the first dimension and the second PMI of the first dimension using the subsampling 1 and receive at least one of the first PMI of the second dimension and the second PMI of the second dimension using the subsampling 2 at the reporting time.

In addition, when the dimension indicator enable information is included or configured in the feedback configuration information, the base station may receive the dimension indicator determined depending on the subsampling used to report the channel state information.

For example, when the terminal transmits the first PMI of the first dimension and the second PMI of the first dimension using the subsampling 1, the base station may receive the dimension indicator which is set to be 0.

In addition, when the terminal transmits the first PMI of the second dimension and the second PMI of the second dimension using the subsampling 2, the base station may receive the dimension indicator which is set to be 1.

However, if the dimension indicator enable information is not included or is not configured in the feedback configuration information, the base station may receive the channel state information based on the information on the number of reporting included in the feedback configuration information. In addition, the base station may receive the channel state information using the initial reporting subsampling setting information.

The information on the number of reporting may include the information on the number of first reporting and the information on the number of second reporting, and the information on the number of first reporting may mean the number of reporting using subsampling #1 and the number of second reporting may mean the number of reporting using subsampling #2. In addition, the initial reporting subsampling configuration information may indicate the subsampling used for the initial reporting.

Therefore, the base station may determine the subsampling to be used according to the initial reporting subsampling configuration information and confirm the number of times to be reported by allowing the terminal to use each subsampling according to the information on the number of reporting.

For example, if the initial reporting subsampling configuration information indicates the subsampling 1, the information on the number of first reporting is set to be 2, and the information on the number of second reporting is set to be 1, the terminal may perform the reporting twice using the subsampling 1 and perform the reporting once using the subsampling 2. Accordingly, the base station may receive the channel state information according to the information on the number of reporting.

Meanwhile, the method for reporting, by a base terminal, channel state information may be configured variously, which is the same as described above. Therefore, the detailed contents thereof will be omitted.

Figure 21:
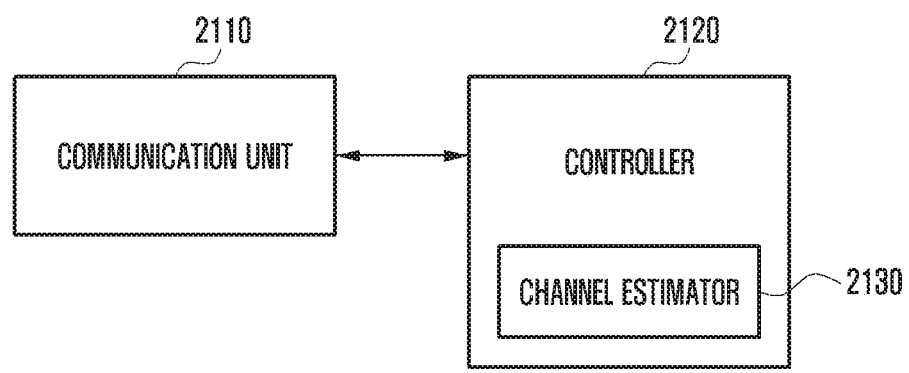
FIG. 21 is a block diagram showing an internal structure of a terminal according to an embodiment of the present disclosure.

FIG. 21 is a block diagram showing an internal structure of a terminal according to an embodiment of the present disclosure.

Referring to FIG. 21, the terminal includes a transceiver 2110 and a controller 2120.

The transceiver 2110 may transmit and receive a signal to and from another network entity. In detail, the transceiver 2110 serves to transmit or receive data from outside (for example, base station). Here, the transceiver 2110 may transmit the channel state information to the base station under the control of the controller 2120.

The controller 2120 may control the state and operation of all the components configuring the terminal.

Specifically, the controller 2120 may receive the configuration information (hereinafter referred to as reference signal configuration information) for the reference signal. The controller 2120 may receive the configuration information for the CSI-RS.

Therefore, the controller 2120 may be confirm at least one of the number of antenna ports for each CSI-RS, the timing and resource location at which each CSI-RS is transmitted, whether to set the RI-reference CSI-process, the corresponding CSI-process index, and transmit power information, based on the received reference signal configuration information.

Thereafter, the controller 2120 may receive the feedback configuration information. The controller 2120 may receive the feedback configuration information through the RRC signaling. The feedback configuration information may include the reference signal configuration information. In this case, the controller 2120 may not receive the receive signal configuration information.

In addition, the feedback configuration information may include any one of a reporting mode, feedback timing information, PMI codebook information, information on the number of first reporting, information on the number of second reporting, reporting offset information, first reporting subsampling configuration information, dimension indictor enable information, and PMI assumption of initial CSI reporting.

In this case, when the dimension indicator enable information is set to use the dimension indicator, the information on the number of first reporting and the information on the number of second reporting are not included in the feedback configuration information, or the controller 2120 may not use the information on the number of first reporting and the information on the number of second reporting.

On the other hand, when the dimension indicator enable information is set to not use the dimension indicator, the controller 2120 may transmit the channel state information to the base station through each subsampling by using the information on the number of first reporting and the information on the number of second reporting.

The detailed contents of the feedback configuration information are the same as described above, and will not be described below.

Thereafter, the controller 2120 may measure the channel by receiving the reference signal. The controller 2120 may receive the CSI-RS and estimate the channel between the base station antenna and the reception antenna of the terminal using the received CSI-RS.

The controller 2120 may generate the channel state information according to the channel measurement result. Specifically, the controller 2120 may calculate the rank information, the PMI, and the CQI by using the received feedback configuration information and the defined codebook, based on the virtual channel added between the estimated channel and the CSI-RS.

For this purpose, the controller 2120 may include a channel estimator 2130. The channel estimator 2130 may determine the required channel state information through the CSI-RS and the feedback configuration information received from the base station and estimate the channel using the received CSI-RS based on the CSI-RS and the feedback configuration information.

Thereafter, the controller 2120 may control the transceiver 2110 to feedback the generated channel state information to the base station according to the timing information allocated from the base station. The controller 2120 may transmit the channel state information to the base station at the defined feedback timing according to the feedback configuration information to finish the process of generating and reporting channel feedback in consideration of the two-dimensional arrangement.

Specifically, the controller 2120 may transmit the channel state information to the base station using at least two subsamplings at the reporting time determined based on the feedback configuration information.

As described above, the channel state information may include the PMI, and the PMI may include a first PMI and a second PMI. In addition, the first PMI may include the PMIs of the first dimension and the second dimension, and the second PMI may include the PMIs of the first dimension and the second dimension.

The first PMI of the first dimension and the first PMI of the second dimension may be transmitted simultaneously or separately. In addition, the second PMI of the first dimension and the second PMI of the second dimension may be transmitted simultaneously or separately. Specifically, the controller 2120 may transmit at least one of the first PMI of the first dimension and the second PMI of the first dimension using the subsampling 1 and at least one of the first PMI of the second dimension and the second PMI of the second dimension using the subsampling 2 at the reporting time.

In addition, when the dimension indicator enable information is included (or configured) in the feedback configuration information, the controller 2120 may determine the dimension indicator depending on the subsampling used to report the channel state information and transmit the determined dimension indicator to the base station.

For example, when the controller 2120 transmits the first PMI of the first dimension and the second PMI of the first dimension using the subsampling 1, the terminal may set the dimension indicator to be 0 and transmit the set dimension indicator to the base station.

In addition, in the case of transmitting the first PMI of the second dimension and the second PMI of the second dimension using the subsampling 2, the controller 2120 may set the dimension indicator to be 1 and transmit the set dimension indicator to the base station.

However, if the dimension indicator enable information is included (or configured) in the feedback configuration information, the controller 2120 may report the channel state information based on the information on the number of reporting included in the feedback configuration information. In addition, the controller 2120 may use the initial reporting subsampling configuration information.

The information on the number of reporting may include the information on the number of first reporting and the information on the number of second reporting, and the information on the number of first reporting may mean the number of reporting using subsampling #1 and the number of second reporting may mean the number of reporting using subsampling #2. In addition, the initial reporting subsampling configuration information may indicate the subsampling used for the initial reporting.

Therefore, the controller 2120 may determine the subsampling to be used according to the initial reporting subsampling configuration information and confirm the number of times to be reported by using each subsampling according to the information on the number of reporting.

For example, if the initial reporting subsampling configuration information indicates the subsampling 1, the information on the number of first reporting is set to be 2, and the information on the number of second reporting is set to be 1, the terminal may perform the reporting twice using the subsampling 1 and perform the reporting once using the subsampling 2.

Meanwhile, a method for reporting, by a controller 2120, channel state information may be configured variously, which is the same as described above. Therefore, the detailed contents thereof will be omitted. Further, the controller 2120 may control the operation of the terminal described in the present disclosure.

In addition, FIG. 21 illustrates an example that the terminal is configured to include the transceiver 2110 and the controller 2120 but the terminal is not limited therefor and therefore may further include various components according to the function performed in the terminal. For example, the terminal may further include a display unit displaying the current state of the terminal, an input unit receiving a signal such as a function performance from the user, a storage unit storing data generated in the terminal, etc. Further, the foregoing embodiment describes that the channel estimator 2130 is included in the controller 2120 but is not necessarily limited thereto. The controller 2120 may control the transceiver 2110 to receive the configuration information for at least one reference signal resource from the base station. Further, the controller 2120 may control the transceiver 2110 to measure the at least one reference signal and receive the feedback configuration information for generating the feedback information depending on the measured result.

Further, the controller 2120 may measure at least one reference signal received through the transceiver 2110 and generate the channel state information according to the feedback configuration information. Further, the controller 2120 may control the transceiver 2110 to transmit the generated channel state information to the base station at the feedback timing depending on the feedback setting information. Further, the controller 2120 may receive the channel status indication—reference signal (CSI-RS) from the base station, generate the channel state information based on the received CSI-RS, and transmit the generated channel state information to the base station. In this case, the controller 2120 may select each of the precoding matrixes for each antenna port group of the base station and further select one additional precoding matrix based on the relationship between the antenna port groups of the base station.

Further, the controller 2120 may receive the CSI-RS from the base station, generate the channel state information based on the received CSI-RS, and transmit the generated channel state information to the base station. In this case, the controller 2120 may select one precoding matrix for all the antenna port groups of the base station. Further, the controller 2120 may receive the feedback configuration information from the base station, receive the CSI-RS from the base station, generate the cannel state information based on the received feedback configuration information and the received CSI-RS, and transmit the generated channel state information to the base station. In this case, the controller 2120 may receive the additional feedback configuration information based on the relationship between the feedback configuration information corresponding to each antenna port group of the base station and the antenna port group.

Figure 22:
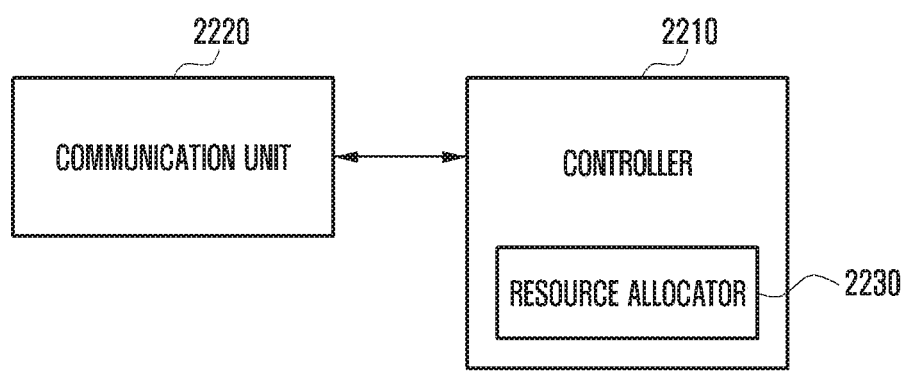
FIG. 22 is a block diagram showing an internal structure of a base station according to an embodiment of the present disclosure.

FIG. 22 is a block diagram showing an internal structure of a base station according to an embodiment of the present disclosure.

Referring to FIG. 22, the base station includes a controller 2210 and a transceiver 2210.

The transceiver 2220 may transmit and receive a signal to and from another network entity. Specifically, the transceiver 2220 may serve to transmit or receive data from the outside. The transceiver 2220 may serve to transmit and receive data, the reference signal, the feedback configuration information, and the channel state information to and from the terminal. Here, the transceiver 2220 may transmit the CSI-RS to the terminal through the resources allocated under the control of the controller 2210 and receive the channel state information from the terminal.

The controller 2210 may control the state and operation of all the components configuring the base station. In detail, the controller 2210 may transmit the reference signal configuration information for the channel estimation of the terminal and transmit the feedback configuration information to the terminal.

The reference signal configuration information may include at least one of the number of ports for each CSI-RS, the timing and resource location at which each CSI-RS at which each CSI-RS is transmitted, whether to set the RI-reference CSI-process, the corresponding CSI-process index, and transmit power information.

In addition, the reference signal configuration information may include the CSI-RS resource allocated to the terminal.

In addition, the feedback configuration information may include feedback resources and feedback timing. The feedback configuration information may include any one of a reporting mode, feedback timing information, PMI codebook information, information on the number of first reporting, information on the number of second reporting, reporting offset information, first reporting subsampling configuration information, dimension indictor enable information, and PMI assumption of initial CSI reporting.

In this case, when the dimension indicator enable information is set to use the dimension indicator, the information on the number of first reporting and the information on the number of second reporting are not included in the feedback configuration information, or the terminal may not use the information on the number of first reporting and the information on the number of second reporting.

On the other hand, when the dimension indicator enable information is set to not use the dimension indicator, the controller 2210 may receive the channel state information through each subsampling by using the information on the number of first reporting and the information on the number of second reporting.

The detailed contents of the feedback configuration information are the same as described above, and will not be described below.

For this purpose, the controller 2210 may further include a resource allocator 2230. The controller 2210 may allocate the feedback configuration and the feedback timing to prevent feedback from several terminal from colliding with each other and receive and interpret the feedback information configured at the corresponding timing.

Thereafter, the controller 2210 may transmit the reference signal (CSI-RS) to the terminal. The terminal may estimate the channels for each port and estimates an additional channel for the virtual channel based on the estimated channels. The terminal may determine the channel state information and generate the PMI, the RI, and the CQI corresponding thereto and transmit them to the base station.

Accordingly, the controller 2210 may receive the channel state information from the terminal at predetermined timing according to the feedback configuration information and may use the channel state information to determine the channel state between the terminal and the base station.

Specifically, the controller 2210 may receive the channel state information using at least two subsamplings at the reporting time determined based on the feedback configuration information.

As described above, the channel state information may include the PMI, and the PMI may include a first PMI and a second PMI. In addition, the first PMI may include the PMIs of the first dimension and the second dimension, and the second PMI may include the PMIs of the first dimension and the second dimension.

The first PMI of the first dimension and the first PMI of the second dimension may be transmitted simultaneously or separately. In addition, the second PMI of the first dimension and the second PMI of the second dimension may be transmitted simultaneously or separately. Specifically, the controller 2210 may receive at least one of the first PMI of the first dimension and the second PMI of the first dimension using the subsampling 1 and at least one of the first PMI of the second dimension and the second PMI of the second dimension using the subsampling 2 at the reporting time.

In addition, when the dimension indicator enable information is included or configured in the feedback configuration information, the controller 2210 may receive the dimension indicator determined depending on the subsampling used to report the channel state information.

For example, when the terminal transmits the first PMI of the first dimension and the second PMI of the first dimension using the subsampling 1, the controller 2210 may receive the dimension indicator which is set to be 0.

In addition, when the terminal transmits the first PMI of the second dimension and the second PMI of the second dimension using the subsampling 2, the controller 2210 may receive the dimension indicator which is set to be 1.

However, if the dimension indicator enable information is not included or is not configured in the feedback configuration information, the controller 2210 may receive the channel state information based on the information on the number of reporting included in the feedback configuration information. In addition, the controller 2210 may receive the channel state information using the initial reporting subsampling setting information.

The information on the number of reporting may include the information on the number of first reporting and the information on the number of second reporting, and the information on the number of first reporting may mean the number of reporting using subsampling #1 and the number of second reporting may mean the number of reporting using subsampling #2. In addition, the initial reporting subsampling configuration information may indicate the subsampling used for the initial reporting.

Therefore, the controller 2210 may determine the subsampling to be used according to the initial reporting subsampling configuration information and confirm the number of times to be reported by allowing the terminal to use each subsampling according to the information on the number of reporting.

For example, if the initial reporting subsampling configuration information indicates the subsampling 1, the information on the number of first reporting is set to be 2, and the information on the number of second reporting is set to be 1, the terminal may perform the reporting twice using the subsampling 1 and perform the reporting once using the subsampling 2. Accordingly, the base station may receive the channel state information according to the information on the number of reporting.

Meanwhile, a method for receiving, by a controller 2210, channel state information may be configured variously, which is the same as described above. Therefore, the detailed contents thereof will be omitted. Further, the controller 2210 may control the operation of the base station described in the present disclosure.

Further, the foregoing embodiment describes that that the resource allocator 2230 is included in the controller 2210 but is not necessarily limited thereto. The controller 2210 may control the transceiver 2220 to transmit the configuration information on each of the at least one reference signal to the terminal or generate the at least one reference signal. Further, the controller 2210 may control the transceiver 2220 to transmit the feedback configuration information for generating the feedback information depending on the measured result to the terminal. Further, the controller 2210 may control the transceiver 2220 to transmit the at least one reference signal to the terminal and receive the channel state information transmitted from the terminal at the feedback timing depending on the feedback configuration information. Further, the controller 2210 may transmit the feedback configuration information to the terminal, transmits the CSI-RS to the terminal, and receive the generated channel state information based on the feedback configuration information and the CSI-RS from the terminal. In this case, the controller 2210 may transmit the additional feedback configuration information based on the relationship between the feedback configuration information corresponding to each antenna port group of the base station and the antenna port group. Further, the controller 2210 may transmit the beamformed CSI-RS to the terminal based on the fed back channel state information and receive the generated channel state information based on the CSI-RS from the terminal. According to the embodiment of the present disclosure, the base station having the transmission antenna of a large number of two-dimensional antenna array structures may prevent the allocation of the excessive feedback resources required to transmit the CSI-RS and the channel estimation complexity of the terminal from increasing and the terminal may effectively measure all the channels for a large number of transmission antennas and configure the measured channel as the channel state information and inform the base station of the same.

Meanwhile, although the exemplary embodiments of the present disclosure have been illustrated in the present specification and the accompanying drawings and specific terms have been used, they are used in a general meaning in order to assist in the understanding the present disclosure and do not limit the scope of the present disclosure. It is obvious to those skilled in the art to which the present disclosure pertains that various modifications may be made without departing from the scope of the present disclosure, in addition to the exemplary embodiments disclosed herein.

The invention claimed is:

1. A method for a terminal, comprising:
   receiving feedback configuration information from a base station;
   measuring a channel state using a reference signal received from the base station;
   determining a first component of a precoding matrix indicator (PMI) based on a first subsampling and a second component of the PMI based on a second subsampling; and
   reporting the first component of the PMI at a first reporting instance and the second component of the PMI at a second reporting instance, the first component and the second component indicating the PMI,
   wherein the first reporting instance and the second reporting instance are determined based on the feedback configuration information.

2. The method of claim 1, wherein the reporting further comprises transmitting a dimension indicator indicating one of the first subsampling and the second subsampling, when dimension indicator enable information is configured in the feedback configuration information.

3. The method of claim 1, wherein the reporting further comprises reporting the first component and the second component based on information on the number of reportings included in the feedback configuration information, when dimension indicator enable information is not configured in the feedback configuration information.

4. A method for a base station, comprising:
transmitting feedback configuration information to a terminal;
transmitting a reference signal to the terminal; and
receiving a first component of a precoding matrix indicator, PMI, at a first reporting instance, and a second component of the PMI at a second reporting instance,
wherein the first component is determined based on a first subsampling and the second component is determined based on a second subsampling, the first component and the second component indicating the PMI, and
wherein the the first reporting instance and the second reporting instance are determined based on the feedback configuration information.

5. The method of claim 4, wherein the receiving further comprises:
receiving a dimension indicator indicating one of the first subsampling and the second subsampling when dimension indicator enable information is configured in the feedback configuration information, and
receiving the first component and the second component based on information on the number of reportings included in the feedback configuration information, when the dimension indicator enable information is not configured in the feedback configuration information.

6. A terminal, comprising:
a transceiver; and
a controller configured to:
receive, via the transceiver, feedback configuration information from a base station,
measure a channel state using a reference signal received from the base station,
determine a first component of a precoding matrix indicator, PMI, based on a first subsampling and a second component of the PMI based on a second subsampling, and
report, via the transceiver, the first component of the PMI at a first reporting instance and the second component of the PMI at a second reporting instance, the first component and the second component indicating the PMI,
wherein the first reporting instance and the second reporting instance are determined based on the feedback configuration information.

7. The terminal of claim 6, wherein the controller is configured to transmit a dimension indicator indicating one of the first subsampling and the second subsampling, when dimension indicator enable information is configured in the feedback configuration information.

8. The terminal of claim 6, wherein the controller is configured to report the first component and the second component based on information on the number of reportings included in the feedback configuration information when dimension indicator enable information is not configured in the feedback configuration information.

9. A base station, comprising:
a transceiver; and
a controller configured to:
transmit, via the transceiver, feedback configuration information to a terminal,
transmit, via the transceiver, a reference signal to the terminal, and
receive, via the transceiver, a first component of a precoding matrix indicator, PMI, at a first reporting instance and a second component of the PMI at a second reporting instance,
wherein the first component is determined based on a first subsampling and the second component is determined based on a second subsampling, the first component and the second component indicating the PMI, and
wherein the the first reporting instance and the second reporting instance are determined based on the feedback configuration information.

10. The base station of claim 9, wherein the controller is configured to receive a dimension indicator indicating one of the first subsampling and the second subsampling.

11. The base station of claim 9, wherein the controller is configured to receive the first component and the second component based on information on the number of reportings included in the feedback configuration information, when dimension indicator enable information is not configured in the feedback configuration information.

* * * * *